(12) United States Patent
Eccleston et al.

(10) Patent No.: US 12,202,381 B1
(45) Date of Patent: Jan. 21, 2025

(54) VEHICLE SEAT WITH AN EMBEDDED OCCUPANCY DETECTOR SYSTEM AND OCCUPANT PROTECTION SYSTEM INCLUDING SAME

(71) Applicant: Zoox, Inc., Foster City, CA (US)

(72) Inventors: James Michael Eccleston, Foster City, CA (US); Daniel Scott Armagost, San Mateo, CA (US); Anthony Iannone, Los Altos, CA (US)

(73) Assignee: Zoox, Inc., Foster City, CA (US)

( * ) Notice: Subject to any disclaimer, the term of this patent is extended or adjusted under 35 U.S.C. 154(b) by 266 days.

(21) Appl. No.: 17/829,139

(22) Filed: May 31, 2022

(51) Int. Cl.
*B60N 2/00* (2006.01)
*G06V 20/59* (2022.01)

(52) U.S. Cl.
CPC ........... *B60N 2/002* (2013.01); *G06V 20/593* (2022.01)

(58) Field of Classification Search
CPC ....... B60N 2/002; B60N 2/003; G06V 20/593
USPC .......... 297/452.27, 452.37, DIG. 1; 264/250, 264/45.1, 41
See application file for complete search history.

(56) References Cited

U.S. PATENT DOCUMENTS

| | | | | |
|---|---|---|---|---|
| 4,837,881 | A | * | 6/1989 | Kondo ...................... B60N 2/70 5/655.9 |
| 5,630,240 | A | * | 5/1997 | Matsuoka ................ B60N 2/58 5/655.9 |
| 6,419,863 | B1 | * | 7/2002 | Khac ................... B29C 44/0461 264/309 |
| 7,661,764 | B2 | * | 2/2010 | Ali ........................ B60N 2/986 297/452.26 |
| 11,235,689 | B2 | | 2/2022 | Jost et al. |
| 11,279,270 | B2 | | 3/2022 | Baer et al. |
| 2004/0012238 | A1 | * | 1/2004 | Zenba ...................... B60N 2/70 297/452.27 |
| 2005/0029843 | A1 | * | 2/2005 | Young ................ G01G 19/4142 297/217.1 |

FOREIGN PATENT DOCUMENTS

JP 2005152158 A * 6/2005 ............. B60N 2/002

* cited by examiner

*Primary Examiner* — Milton Nelson, Jr.
(74) *Attorney, Agent, or Firm* — Lee & Hayes, P.C.

(57) ABSTRACT

A vehicle seat with an embedded occupancy detector system and manufacturing method for same, and an occupant protection system including an occupancy detector system embedded in a vehicle seat as described herein. Examples include a molded vehicle seat with one or more inserts including an occupant detection system with one or more sensor pads. A gap housing one or more sensor pads of an occupant detection system may be provided between a surface of an insert and a recessed surface of the molded vehicle seat.

14 Claims, 13 Drawing Sheets

VEHICLE SEAT WITH AN EMBEDDED OCCUPANCY DETECTOR SYSTEM AND OCCUPANT PROTECTION SYSTEM INCLUDING SAME

BACKGROUND

Occupant detection systems are used in vehicles for a variety of reasons. One such use is by incorporating the detector system in a vehicle seat. How an occupant detection system is incorporated into a seat, however, may impact the manufacturing process of the whole seat. As such, different occupant detection systems having different capabilities are often implemented based on the seat manufacturing process. This can add costs and limit the selectivity of the occupant detection system that may be used.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1A:
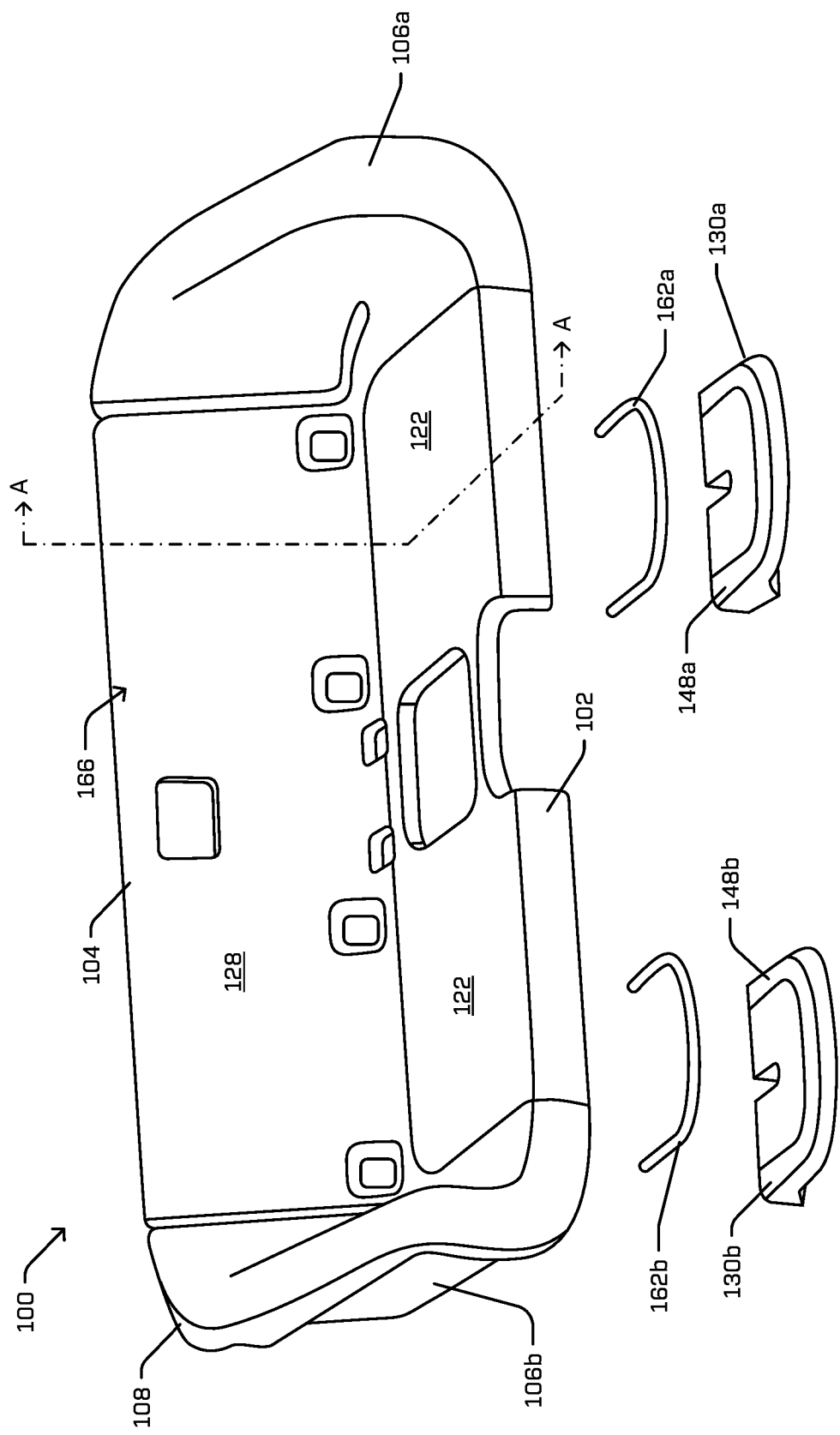
FIGS. 1A-1K illustrate examples of a vehicle seat with a recess and insert as described herein.

A vehicle seat with an embedded occupancy detector system and manufacturing method for same are described herein. Also described is an occupant protection system including an occupancy detector system embedded in a vehicle seat as described herein. In examples, the seat may be manufactured by a foam in place process. In examples, a seat mold can be used to form a seat by injecting or shooting foam into the mold that has been lined by a membrane, and then curing the foam. In examples, this process may result in a seat in which the outer membrane and the internal foam are adhered together to form the seat. In examples, the seat may include a seat base, a seatback, and optionally one or more side portions. In examples, the seat mold may be configured such that when the seat is formed it may include a recess or well configured to receive a plug or insert. In examples, the recess or well may be in the seat base. In examples, the recess may be in a bottom portion of the seat base. In examples, a plug or insert may be formed by a foam in place process. In examples, the plug or insert may be formed by injecting or shooting foam into a mold and then curing the foam. In examples, the plug or insert may be sized and shaped to fit in the recess or well provided in the seat formed using the seat mold. In examples, at least a portion of an occupant detection system (ODS) may be provided on the plug or insert. In examples, the plug or insert with at least a portion of the ODS installed thereon may be inserted in the recess provided in the seat. In examples, when the plug or insert is installed in the seat, a gap may be formed between a surface of the plug or insert and a surface of the seat. In examples, a gap may be formed between a top surface of the plug or insert and a bottom surface of the seat. In examples, a gap may be formed between a top surface of the plug or insert and a bottom surface of the seat base. In examples, the ODS may include one or more sensor pads. In examples, the one or more sensor pads may be located over the top surface of the plug or insert that defines a gap with the bottom surface of the seat. In examples, the gap formed may be at a distance from a top surface of the seat. For example, the gap may be at a distance from a top surface of the seat base. In examples, foam may be present between the gap and the top surface of the seat or seat base.

In examples, an occupant protection system may include or be in communication with the ODS provided on the plug or insert installed in the vehicle seat. In examples, based on signals caused to be generated, output, and/or sent by the ODS in response to an occupant or other body occupying the vehicle seat, the occupant protection system may engage and/or disengage one or more safety systems such as a seatbelt system, an airbag system, other occupant protections systems, or any combination thereof.

As mentioned above, an ODS may be used in vehicle seats to detect the presence of an occupant and/or other body that may occupy the vehicle seat. The level of sensitivity and reliability of an ODS may be important as the signals generated, output, and/or sent by an ODS may be used to affect the functionality of other portions of the vehicle. In examples, an ODS may be used in conjunction with a seatbelt safety system. In examples, a more advanced ODS may also be used in conjunction with other occupant safety systems, such as an airbag system. In examples, it may be desirable to avoid the activation of an occupant safety system even if some pressure is sensed on the vehicle seat. For examples, when the vehicle seat is occupied by a child seated in a booster seat, it may be desirable not to activate an airbag safety system to avoid possible injuries to the child. Thus, sensitivity of an ODS may impact the overall safety an occupant safety system may provide. In examples, the incorporation of an ODS into a seat may adversely impact the sensitivity or reliability of the ODS thus rendering it less suitable for certain functionalities. For example, incorporation of an ODS sensor in a seat manufactured by a foam in place process may encounter issues with the foam creeping over sensor pads of the ODS and cause a preload to be registered by the ODS or displacement of the sensor during foam curing such that it may not be parallel to a top seat surface and provide unreliable readings. Additionally, some sensors useful for ODS may lack provisions for calibration of the sensor to account for inadvertent preloading of the sensor due to foam in place seat manufacturing processes.

A means to resolve the issue may be to install an ODS between the seat foam and the seat outer membrane. Although this may result in higher detection reliability, this approach may also result in read through the surface of the seat making the sensor visible which may not be aesthetically desirable. Also, in cases the sensor may be felt through the outer membrane, possibly leading to a decrease in comfort.

In examples, the manufacturing process and seat as described herein can avoid one or more issues encountered in the known processes. In examples, the manufacturing process and seat as described may result in a more reliable ODS reading. In examples, by using a seat manufactured as described, it may be possible to employ a less sensitive ODS without limiting overall vehicle safety functionality. In examples, using a seat manufactured as described, may make it possible to rely on an ODS reading for multiple safety functions such as the combined operation of a safety belt system and an airbag system. Other safety systems may also be made rely on an ODS reading as implemented and described herein.

In examples, a method of embedding an occupant detection system in a vehicle seat, including forming a vehicle seat molded body comprising a recess including injecting a first foam into a seat membrane within a first mold; forming a plug; providing at least a portion of the occupant detection system on the plug; and coupling the plug with at least a portion of the occupant detection system provided thereon to the vehicle seat molded body by placing the plug into the recess, wherein a gap is defined by a surface of the recess in the vehicle seat molded body and a surface of the insert.

In examples, a method of embedding an occupant detection system in a vehicle seat, including forming a vehicle seat molded body comprising a recess by injecting a first foam into a first mold; forming a plug by injecting a second foam into a second mold, providing the occupant detection system on the insert; and installing the plug with the occupant detection system provided thereon into the recess of the vehicle seat molded body.

In examples, a vehicle seat including a molded body comprising a recess, wherein the molded body comprises an outer membrane and a foam cured in place such that it is coupled to the outer membrane; and a plug comprising one or more sensor pads, the plug provided in the recess of the molded body.

The techniques and systems described herein may be implemented in a number of ways. Example implementations are provided below with reference to the figures.

FIGS. 1A-1K illustrate examples of a vehicle seat with a plug or insert as described herein. FIG. 1A shows an example exploded view of a vehicle seat 100 with one or more plug or inserts 130 (e.g., 130*a* and 130*b*) as described herein. As illustrated, vehicle seat 100 may include a vehicle seat molded body 166 including one or more of a seat base 102, a seatback 104, and first and second side portions 106*a* and 106*b*. In examples, the vehicle seat 100 may include an outer membrane 108 and a foam filler 110. In examples, vehicle seat 100 may have any shape or size as desired depending on the vehicle in which it is to be installed.

In examples, vehicle seat 100 may be a single occupant seat or a multi-occupant seat. As illustrated, vehicle seat 100 may be a multi-occupant seat, however, this is just an example. In examples, vehicle seat 100 may be provided in any vehicle type. In examples, the vehicle may be an automobile or other land vehicle, a watercraft, an aircraft, or any other type of vehicle. In examples, the vehicle may be a wheeled vehicle, a railed vehicle, a tracked vehicle, or any combination thereof. In examples, the vehicle may be an autonomous vehicle, a non-autonomous vehicle, or a combination thereof.

In examples, vehicle seat 100 may be an injection molded body formed using a foam-in-place process. In examples, a foam-in-place process may allow greater flexibility in seat design. In examples, a foam-in-place process may include injecting or shooting foam into a mold followed by a curing step. In examples, an outer membrane 108 may be provided to line the mold prior to injection of the liquid foam. In examples, an outer membrane 108 may be vacuum in place over a mold and then foam may be injected into the mold lined by outer membrane 108. In this manner, as the foam filler 110 is cured and sets in place, it adheres to and becomes an integral piece with the outer membrane 108 to form the molded body of vehicle seat 100. In examples, by this process, no stitching or added adhesive or other fastener such as a hook and loop fastener, for example, Velcro, may be required to maintain the outer membrane 108 in place over the cured foam filler 110.

In examples, any suitable material used for vehicle seats may be used for outer membrane 108. In examples, outer membrane 108 may include a polymer. In examples, outer membrane 108 may include an organic material. In examples, outer membrane 108 may include leather, leatherette, nylon, polyester, alcantara, acrylic fur, natural fiber such as cotton, vinyl, such as for example, polyvinylchloride, or any combination thereof. In examples, the outer membrane 108 may include fabric, for example suede or denim, it may include fur, it may include a sheet of leather or plastic, or any combination thereof.

In examples, any suitable foam material may be used for foam filler 110 of the molded body of vehicle seat 100. In examples, the foam material may include a polyurethane foam. In examples, during the foam-in-place process a foam mixture is used. In examples, a foam mixture may include isocyanates, polyols, catalysts, one or more additives or any combination thereof. In examples, the polyurethane foam is a porous, cellular-structured, synthetic material. In examples, the polyurethane foam may be formed by the reaction of polyols and diisocyanates. Other materials that may be suitable for injection molding and for use of vehicle seats may also be used in place of polyurethane foam and/or in combination with polyurethane foam. In examples, once cured and in place, the foam material used for foam filler 110 may exhibit a firmness of about $450 \text{ N/mm}^2 \pm 50 \text{ N/mm}^2$. For purposes of this disclosure, the firmness is measured by a 25% Indentation Force Deflection (IFD) testing per ASTM D3574, which may include measuring the force required to indent an area 203 mm in diameter of the foam filler to 25% of its initial thickness.

Figure 1B:
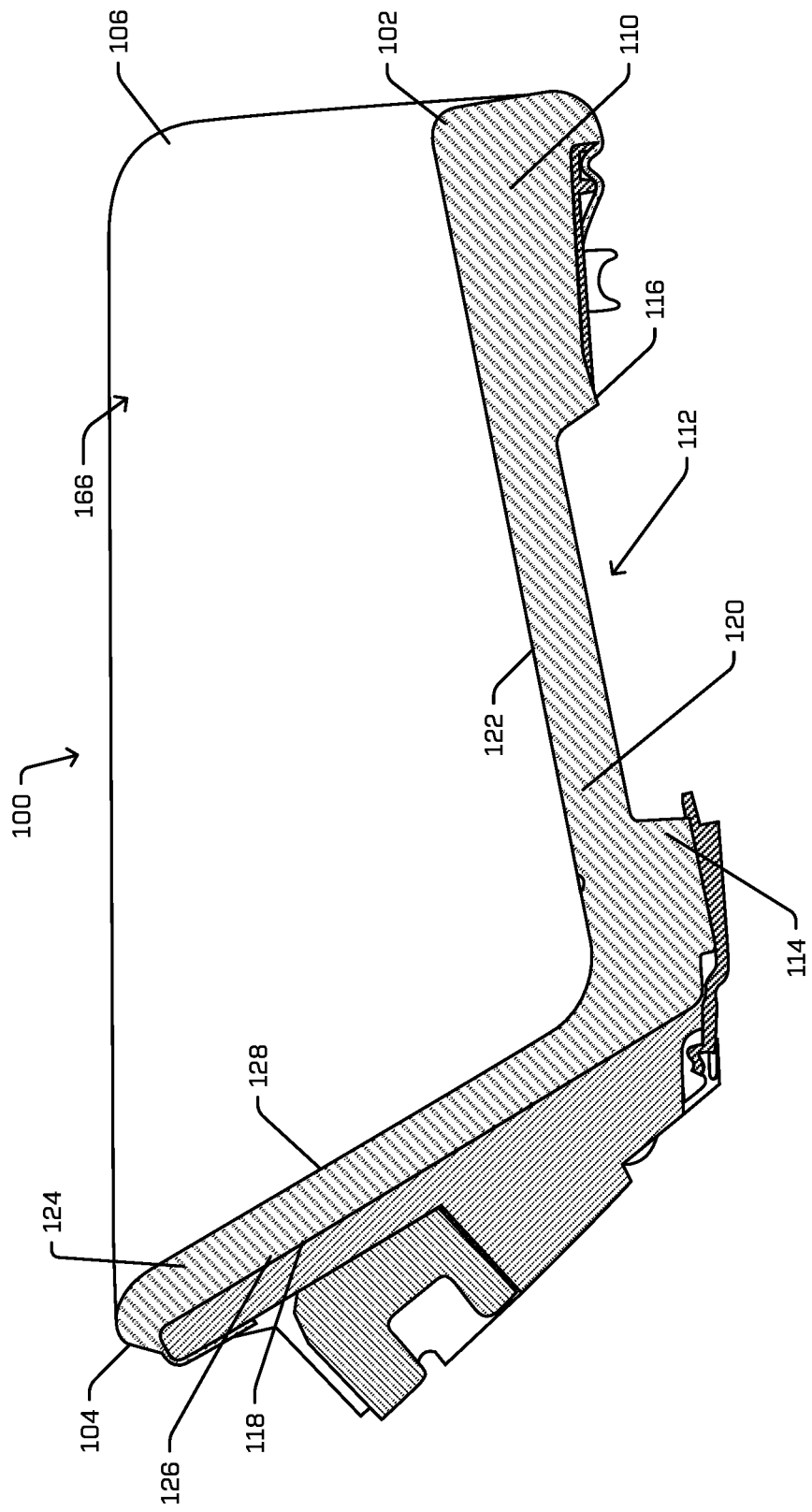

In examples, a mold used for forming the molded body of vehicle seat 100 may be configured to include an indentation or like structures to form a well or recess 112 in a portion of vehicle seat 100. In examples, the recess or well 112 may be located anywhere in vehicle seat 100. In examples, recess or well 112 may be provided in a portion of the seat base 102. In examples, as shown in FIG. 1B, which is a cross-sectional view at A-A of FIG. 1A, a recess or well 112 may be provided at a bottom portion 114 of seat base 102.

In examples, vehicle seat 100 and its subcomponents may include a top or front surface and a bottom or back surface. For purposes of this description a top or front surface refers to the surface of the vehicle seat 100 or subcomponent thereof that faces an occupant when an occupant is seated in vehicle seat 100. A bottom or back surface, on the other hand, is to be understood as the surface of vehicle seat 100 or subcomponent thereof that is opposite the top or front surface and thus typically faces a vehicle frame or floor of a vehicle in which the vehicle seat 100 is installed.

In examples, a recess or well 112 may be provided at bottom surface 116 of seat base 102, a back surface 118 of seatback 104, or both. In examples, seat base 102 may include a top portion 120 and a bottom portion 114. In examples, top portion 120 of seat base 102 may be a portion of seat base 102 that include a top surface 122 of seat base 102. In examples, bottom portion 114 of seat base 102 may include bottom surface 116 of seat base 102. In examples, top surface 122 is opposite bottom surface 116. In examples, the seatback 104 may include a front portion 124 and a back portion 126. In examples, the front portion 124 may include a front surface 128, while the back portion 126 may include back surface 118. In examples, front surface 128 may be opposite back surface 118.

In examples, foam filler 110 is located between the top or front surface of vehicle seat 100 and its subcomponents and the bottom or back surface. For example, foam filler 110 may be present at least in some areas between top surface 122 and bottom surface 116 of seat base 102. In examples, foam filler 110 may be preset at least in some areas between front surface 128 and back surface 118 of seatback 104.

In examples, the foam filler 110 between a top or front surface and the bottom or back surface of a vehicle seat may have a thickness. In examples, the thickness at least at one location of the vehicle seat, seat base, and/or seatback may be greater than zero millimeters. In examples, the thickness at least at one location of the vehicle seat, seat base, and/or seatback may be 150 mm or less. For purposes of this discussion, the thickness should be understood as the shortest, perpendicular distance between a top or front surface and a bottom or back surface in a location of the vehicle seat or subcomponent thereof. In examples, the thickness may be 10 mm, 15 mm, 20 mm, 25 mm, 30 mm, 35 mm, 40 mm, 50 mm, 60 mm, 70 mm, 80 mm, 90 mm 100 mm, 110 mm, 120 mm, 130 mm, 140 mm, or 150 mm. In examples, the thickness may be any thickness within a range defined by any two of the listed examples. Increasing the thickness beyond these specifications may result in an inability of an ODS sensor from being able to accurately detect an adult passenger versus a child passenger to support safety critical passenger protection systems.

Figure 1C:
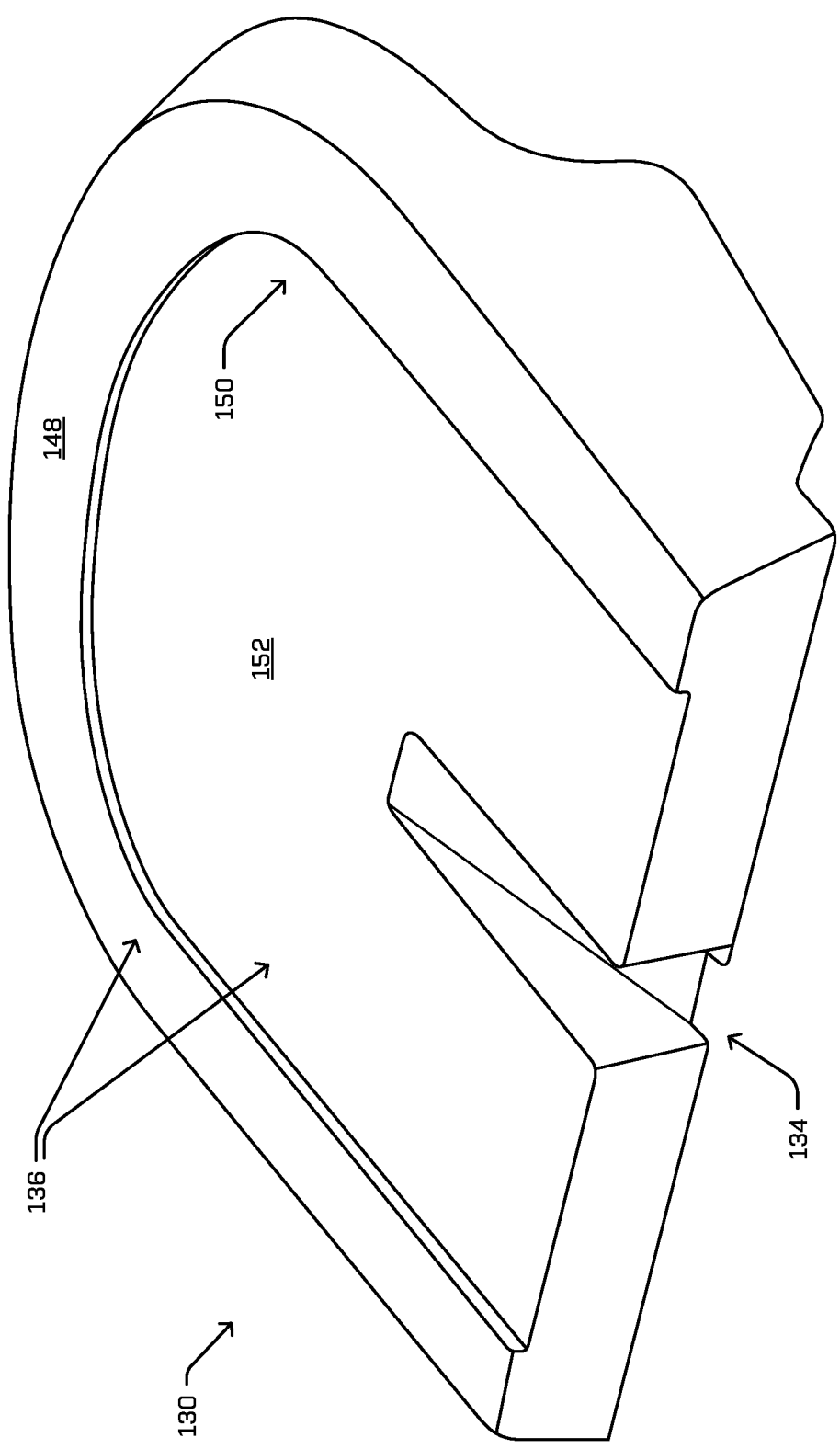

In examples, a plug or insert 130 may be provided in recess or well 112. In examples, plug or insert 130 may be coupled to vehicle seat 100, i.e. plug or insert 130 is inserted into a recess or well 112. In examples, plug or insert 130 may be bonded to vehicle seat 100 as described herein when it is inserted into a recess or well 112. FIG. 1C illustrates an example of a plug or insert 130. In examples, a plug or insert 130 may be formed via a foam-in-place process using the same or a similar foam filler material as described for foam filler 110 of vehicle seat 100. In examples, a plug or insert 130 may include an outer membrane. In examples, a plug or insert 130 may not include an outer membrane. In examples, a plug or insert 130 may be formed of foam filler only. In examples, an outer membrane may be used to enhance structural integrity. In examples, an outer membrane may include a material configured to not interfere with the insertion of the plug or insert 130 into recess or well 112. In examples, the membrane may include plastic or other polymer material.

In examples, plug or insert 130 may be formed by a process other than a foam-in-place process. In examples, plug or insert 130 may be cut from or stamped out of a sheet of foam material. In examples, plug or insert 130 may be provided by any suitable means.

Figure 1D:
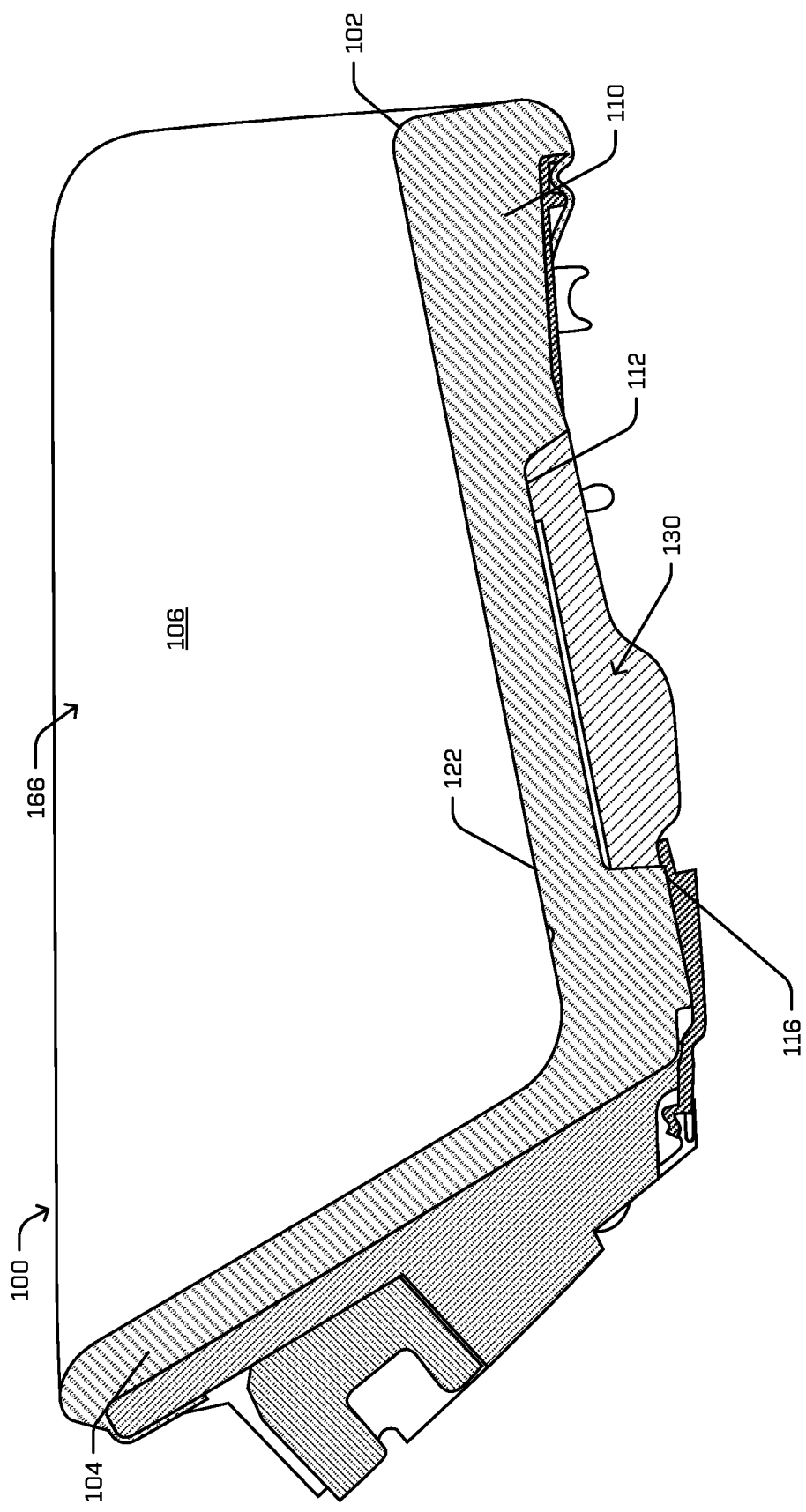
Figure 1E:
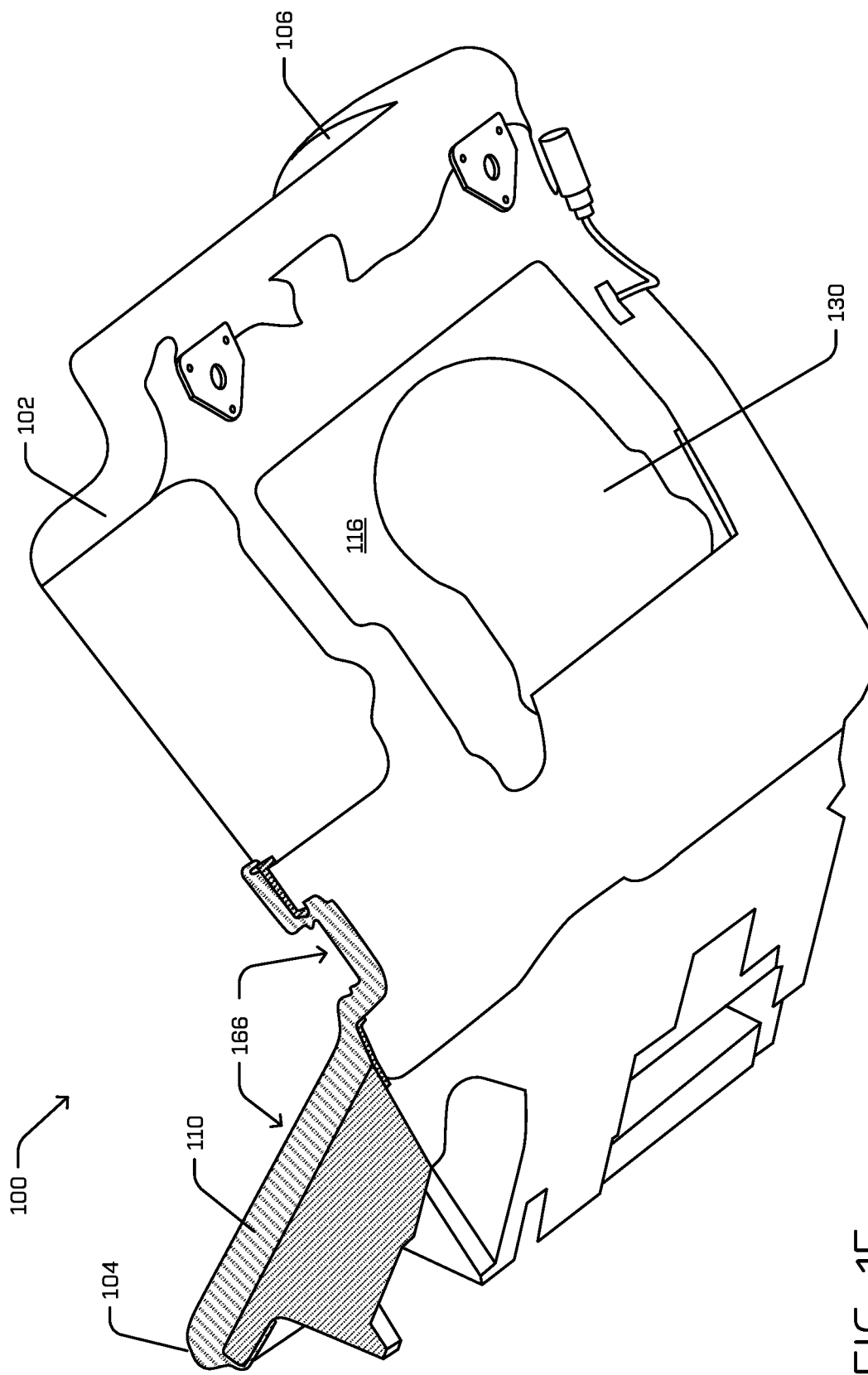

In examples, plug or insert 130 may be shaped and sized to fit in the recess or well 112 formed in vehicle seat 100 as for example shown in FIG. 1D, which is a cross-sectional view at A-A of FIG. 1A, and in FIG. 1E, which is a bottom perspective view of what is shown in FIG. 1D. In examples, the shape and size of plug or insert 130 may be dictated by the shape and size of the recess or well 112. In examples, the shape and size of the recess or well 112 may be dictated by the shape and size of the plug or insert 130. In examples, plug or insert 130 and recess or well 112 are configured so that the plug or insert 130 fits tightly into recess or well 112.

In examples, the shape and size of plug or insert 130 may be dictated by the layout of one or more sensor pads of an occupant detection system or ODS 132 as described herein.

In examples, plug or insert 130 may be configured to include at least a portion of an occupant detection system or ODS 132. In examples, plug or insert 130 may be configured to include a cutout 134 to accommodate one or more signal pathways of an ODS 132 to an edge portion of plug or insert 130 and/or vehicle seat 100. In examples, plug or insert 130 may include a top surface 136 may be configured to house or accommodate at least a portion of the ODS 132.

Figure 1F:
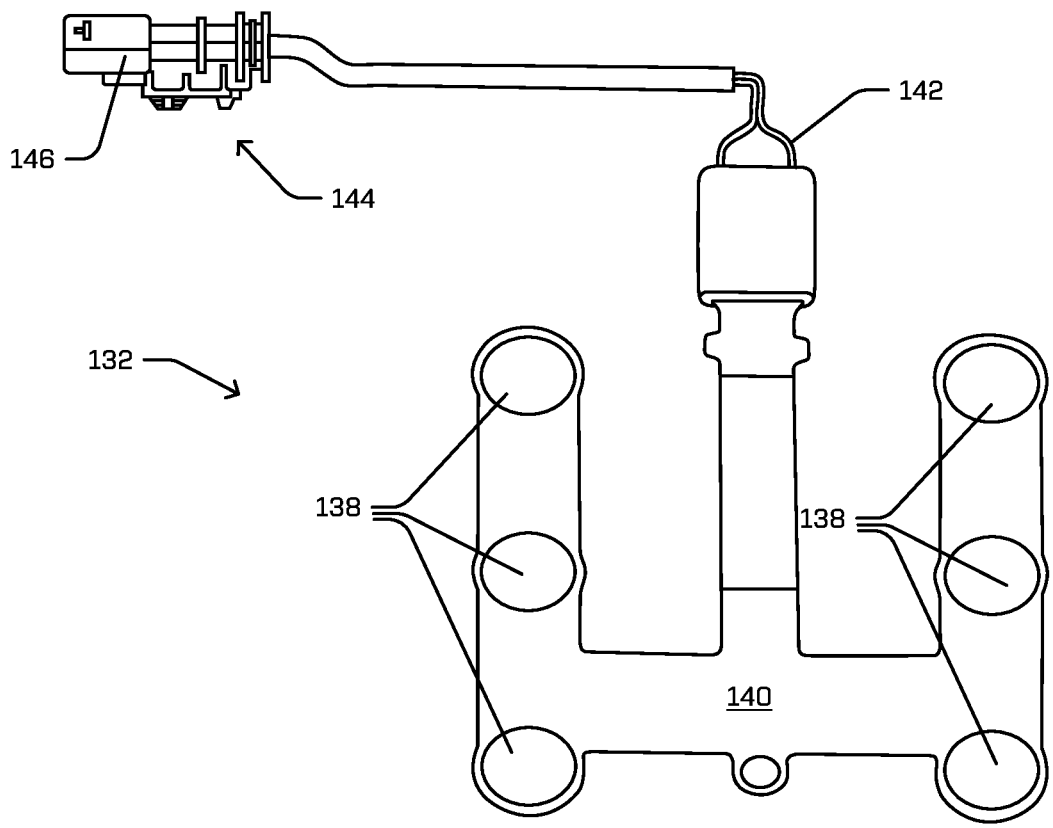
Figure 1G:
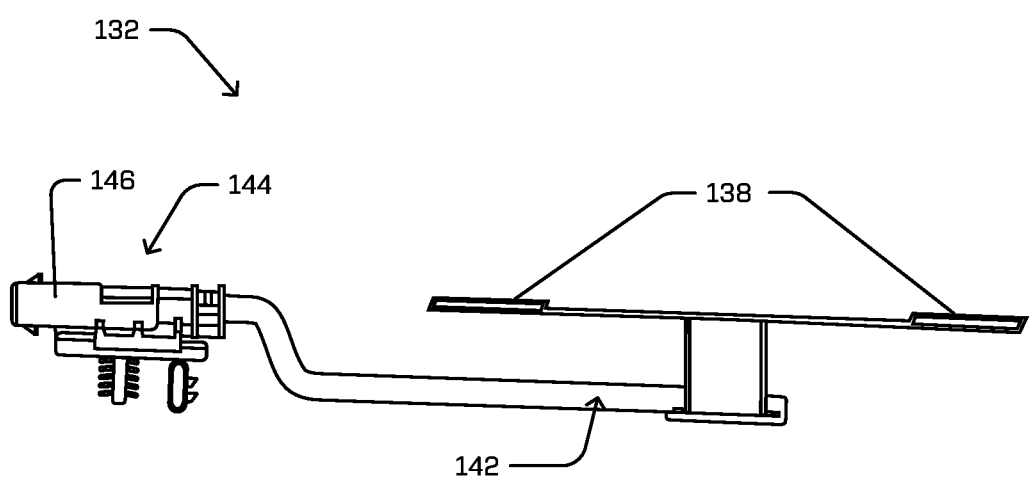

Any occupant detection system may be used as ODS 132 for purposes of this disclosure. FIGS. 1F-1G illustrate an example ODS 132. In examples, ODS 132 may include one or more sensor pads 138. In examples, a sensor pad 138 may include a pressure sensor. In examples, a sensor pad 138 may include a pressure sensitive disc within a membrane substrate. In examples, a sensor pad 138 may include pairs of metal contact plates separated by spacers. In examples, a sensor pad 138 may cause a signal to be generated, output, and/or sent when a pressure exceeding a threshold is applied to the sensor pad 138. In examples, a sensor pad 138 may include a flexible strain gauge. In examples, a sensor pad 138 may include a membrane and configured to generate, output, and/or send a discrete signal based on the amount of bending of the membrane. In examples, a sensor pad 138 may cause a signal to be generated, output, and/or sent reflective and/or correlated to the degree of pressure sensed. In examples, a sensor pad 138 may be configured to cause a signal indicative of the degree of pressure sensed to be generated, output, and/or sent when a pressure sensed exceeds a minimum threshold.

Figure 1H:
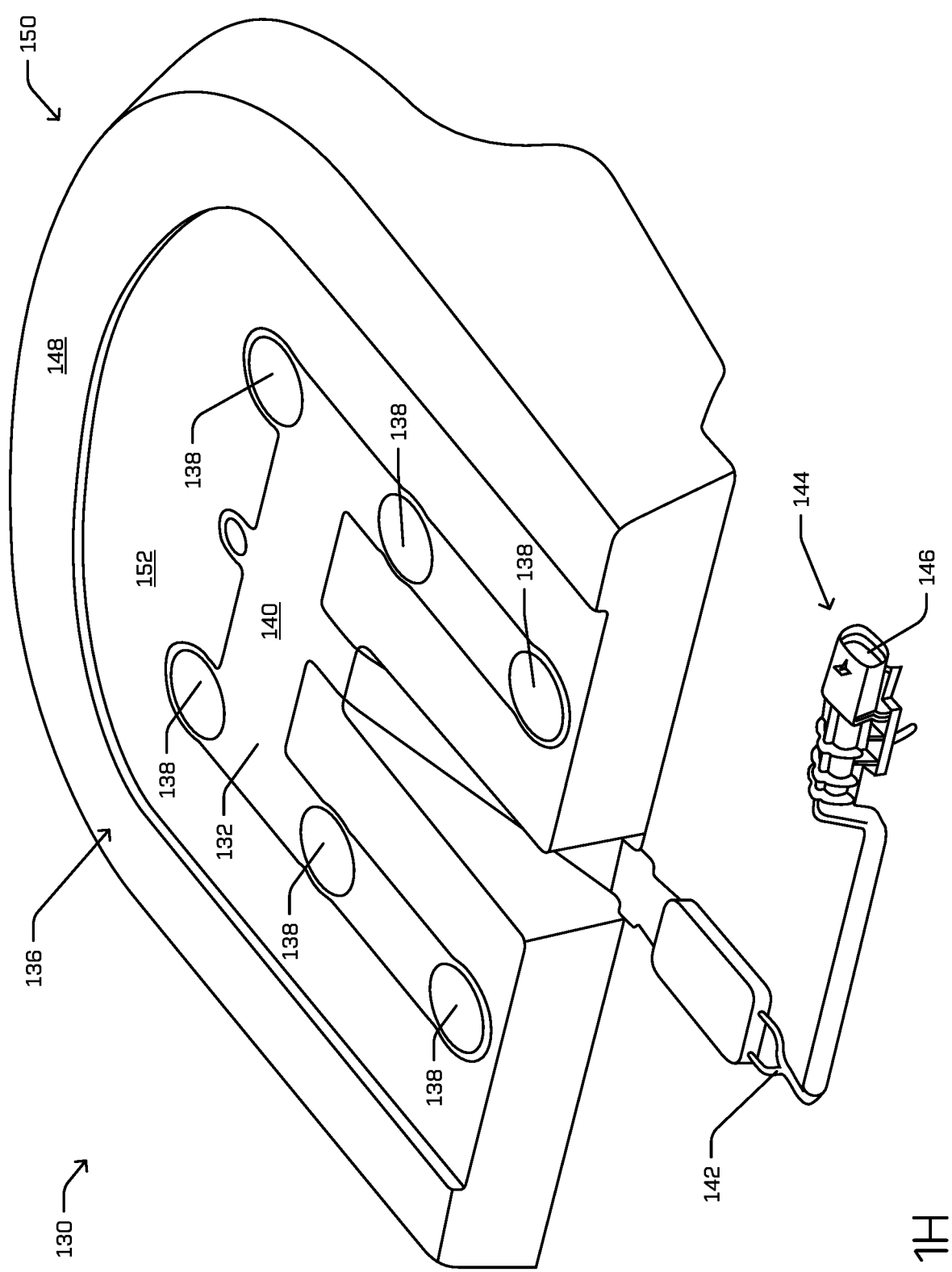

In examples, an ODS 132 may have any number of sensor pads 138. In examples, as shown in FIG. 1H, top surface 136 of plug or insert 130 may be configured to house or accommodate the one or more sensor pads 138 of ODS 132. In examples, an ODS 132 may include from 3 to 9 sensor pads 138. In examples, ODS 132 may include 6 sensor pads 138. In examples, sensor pads 138 may be evenly or unevenly spaced. In examples, sensor pads 138 may be arranged geometrically or at random. In examples, the one or more sensor pads 138 may be arranged in different patterns, regularly or irregular spaced, symmetrically or non-symmetrically arranged, in any shape or direction over top surface 136 of plug or insert 130. In examples, the one or more sensor pads 138 may be arranged and/or spaced based on a desired sensitivity target. For example, in examples, the one or more sensor pads 138 may be arranged and/or spaced such that direct pressure may be sensed by two or more sensor pads 138 when an average adult human occupies the vehicle seat in a standard sitting position. In examples, the one or more sensor pads 138 may be arranged and/or spaced based to detect the direct pressure when something other than an adult human occupies the seat. In examples, when pressure is sensed by only one of the one or more sensor pads 138 and/or when pressure in the area is sensed by not directly on two or more of the sensor pads 138, it may be possible for the vehicle system to determine that something other than the target is occupying the vehicle seat. For example, if the sensor are arranged and/or spaced to correspond to the main pressure points of when an average adult human occupies the vehicle seat, then it may be determined when something other than an average adult human is present, for example, when a child occupies the seat instead, or when an adult human may not be properly seated. As illustrated in FIGS. 1F-1H, the one or more sensor pads 138 of ODS 132 may be configured in parallel rows spaced to correspond to main pressure points areas caused by an average size adult human occupying the vehicle seat in a standard sitting position with a back against the backseat, and both feet flat on the vehicle floor. This is only an example. In examples, plug or insert 130 may be sized and shaped to include surface 136 to accommodate the arrangement and/or spacing of the one or more sensor pads 138. In examples, the size and shape of plug or insert 130 may be dictated and/or based on the arrangement and/or spacing of one or more sensor pads 138.

In examples, one or more sensor pads 138 of ODS 132 may be bonded to top surface 136 of plug or insert 130 by any suitable fastener. In examples, one or more sensor pads 138 of ODS 132 may be bonded to top surface 136 of plug or insert 130 by an adhesive. Any suitable adhesive may be used. In examples, one or more sensor pads 138 of ODS 132 may be bonded to top surface 136 of plug or insert 130 by a pressure sensitive adhesive. In examples, a pressure sensitive adhesive may be an acrylate polymer, rubber, natural rubber, synthetic thermoplastic elastomer, epoxy resin, any combination thereof, or other suitable adhesive. In examples, pressure sensitive adhesive may be applied via a tape.

In examples, the one or more sensor pads 138 may be connected physically and/or electrically via a connecting structure 140.

In examples, ODS 132 may include one or more signal lines 142 configured to provide an electrical or signal connection pathway between one or more sensor pads 138 and a vehicle system 300. In examples, the one or more signal lines 142 may be provided separately, in place of, and/or as part of connecting structure 140. In examples, connecting structure 140 and/or one or more signal lines 142 may extend to an edge portion or beyond an edge portion of plug or insert 130. In examples, connecting structure 140 and/or one or more signal lines 142 may extend through the foam filler of plug or insert 130. In examples, connecting structure 140 may be configured to provide a signal conducting pathway between the one or more sensor pads 138 and one or more additional components of the ODS 132, a connection 144 to vehicle system 300, and/or directly to vehicle system 300. In examples, connecting structure 140 and/or one or more signal lines 142 may extend to a coupler 146 configured to couple one or more signal lines 142 to vehicle system 300.

In examples, plug or insert 130 may be configured to include a cutout 134 to allow for connecting structure 140 and/or one or more signal lines 142 to extend across and/or through a region of plug or insert 130. In examples, cutout 134 may be formed as a recess that extends away from top surface 136 of plug or insert 130. In examples, as shown, cutout 134 may include a sloped profile and extend across a thickness of plug or insert 130. In examples, cutout 134 may be sized and shaped as desired. In examples, cutout 134 may be sized and shaped to accommodate the one or more signal lines 142 and/or connecting structure 140.

In examples, top surface 136 of plug or insert 130 where the one or more sensor pads 138 of ODS 132 are located may include a flat surface. In examples, top surface 136 of plug or insert 130 where the one or more sensor pads 138 of ODS 132 are located may include a non-flat surface. In examples, top surface 136 of plug or insert 130 where the one or more sensor pads 138 of ODS 132 are located may include an indentation and/or a depression. In examples, top surface 136 of plug or insert 130 may include a relieved edge portion 148 at least at a portion of a peripheral area 150 and at least a portion including a depressed or unrelieved area 152. In examples, edge portion 148 may extend to a height that is greater than the height of depressed or unrelieved area 152. In examples, to edge portion 148 is relieved compared to depressed or unrelieved area 152. In examples, depressed or unrelieved area 152 is depressed or indented as compared to edge portion 148.

In examples, plug or insert 130 including ODS 132 bonded thereto may be bonded to a bottom or back surface of vehicle seat 100 via an adhesive. Any suitable adhesive may be used. In examples, plug or insert 130 may be bonded to vehicle seat 100 by a pressure sensitive adhesive. In examples, a pressure sensitive adhesive may be an acrylate polymer, rubber, natural rubber, synthetic thermoplastic elastomer, epoxy resin, any combination thereof, or other suitable adhesive. In examples, pressure sensitive adhesive may be applied via a tape. In examples, an adhesive, such as a pressure sensitive adhesive or other type of adhesive, may be provided over a top surface of edge portion 148 that is configured to contact and, optionally, face the bottom or back surface of vehicle seat 100 when plug or insert 130 is installed in recess or well 112.

Figure 1I:
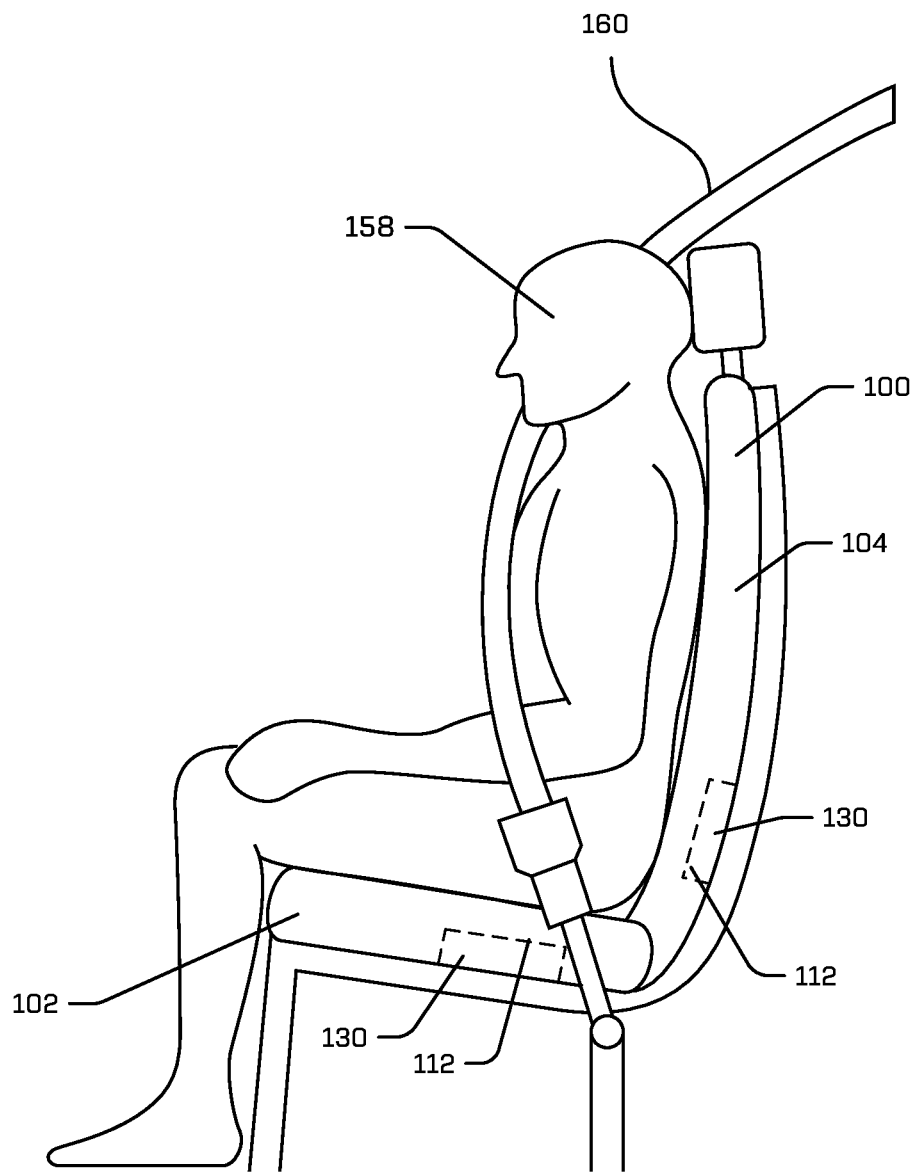

In examples, as shown in FIG. 1I, a recess or well 112 with a plug or insert 130 may be provided in a portion of the seat base 102, seatback 104, or both of a vehicle seat 100. For reference, FIG. 1I also illustrates an occupant 158 occupying vehicle seat 100 and at least a portion of a seatbelt safety system 160. In examples, when plug or insert 130 is inserted in a recess or well 112, a top surface 136 of plug or insert 130 may be oriented toward the same direction as a top and/or front surface of vehicle seat 100, for example toward the same direction as the top surface 122 of seat base 102 or toward the same direction as the front surface 128 of seatback 104.

In examples, a recess or well 112 may be provided in a portion of seat base 102. In examples, a recess or well 112 may be provided at a bottom portion 114 of seat base 102. In examples, plug or insert 130 may be installed or inserted in recess or well 112 provided in a portion of the seat base 102. In examples, plug or insert 130 may be installed or inserted in recess or well 112 provided at a bottom portion 114 of seat base 102. In examples, recess or well 112 is formed at a bottom surface 116 of seat base 102 and plug or insert 130 is installed therein. As such, the top surface 136 of plug or insert 130 faces the bottom surface 116 of seat base 102. In examples, when plug or insert 130 is inserted in recess or well 112 in seat base 102, top surface 136 of plug or insert 130 is oriented toward the same direction as the top surface 122 of seat base 102. In examples, a top surface of edge portion 148 faces and contacts at least part of a recessed portion 156 of bottom surface 116 of seat base 102 that at least partially defines the recess or well 112. In examples, an adhesive, such as a pressure sensitive adhesive, may be provided at least between a top surface of edge portion 148 and recessed portion 156 of bottom surface 116 of seat base 102. In this manner, in examples, the plug or insert 130 with ODS 132 installed thereon may be located at a bottom portion of seat base 102 under an area of vehicle seat 100 over which an occupant of the vehicle may sit.

In examples, recess or well 112 may be provided in a portion of the seatback 104. In examples, not shown, a recess or well 112 may be provided at a back surface 118 of seatback 104. In examples, plug or insert 130 may be installed or inserted in recess or well 112 provided at a back surface 118 of seatback 104. As such, the top surface 136 of plug or insert 130 faces the back surface 118 of seatback 104. In examples, when plug or insert 130 is inserted in recess or well 112 in seatback 104, top surface 136 of plug or insert 130 is oriented toward the same direction as the front surface 128 of seatback 104. In examples, a top surface of edge portion 148 faces and contacts at least part of a recessed portion of back surface 118 of seatback 104 that at least partially defines the recess or well 112.

In examples, an adhesive 162, such as a pressure sensitive adhesive, may be provided at least between a top surface of edge portion 148 and recessed portion of back surface 118 of seatback 104. In this manner, in examples, the plug or insert 130 with ODS 132 installed thereon may be located at a back portion of seatback 104 behind an area of vehicle seat 100 against which the back of an occupant sitting on vehicle seat 100 may rest.

In examples, one or more inserts 130 with ODS 132 may be provided at a bottom portion of seat base 102, at a back surface of seatback 104, or a combination thereof.

In examples, when an occupant or other body is placed on vehicle seat 100, the weight of the occupant or other body may cause a force to be applied the front and/or top surface of vehicle seat 100. In examples, the force applied to the front and/or top surface of vehicle seat 100 may cause at least partial depression of foam filler 110 above or in front of plug or insert 130. In examples, as the foam filler 110 is, it may press against the top surface 136 of plug or insert 130 where the one or more sensor pads 138 of ODS 132 are located. In examples, as pressure is applied to the one or more sensor pads 138, sensor pads 138 may sense the pressure and cause a signal to be generated, output, and/or sent to vehicle system 300 via connecting structure 140 and/or one or more signal lines 142. In examples, the amount of pressure sensed by one or more sensor pads 138 may be correlated to a type of occupant or body positioned on vehicle seat 100. In examples, the arrangement of one or more sensor pads 138 of ODS 132 may be configured to sense a pressure only when a certain type and/or size of occupant or other body is present on vehicle seat 100.

For examples, the one or more sensor pads 138 may be arranged in such a manner and/or be configured to generate varying signals based on varying amounts of pressure sensed. In examples, one or more signals caused to be generated, output, and/or sent to vehicle 300 by ODS 132 and/or one or more sensor pads 138 may be correlated to an occupant and/or object or body type. In examples, a signal may be correlated to an adult human occupant. In examples, a signal may be correlated to a child human occupant. In examples, a signal may be correlated to a non-human occupant, such as an animal. In examples, a signal may be correlated to body being present on vehicle seat 100 that may include a foreign object. For example, a signal may be correlated to the detection and/or presence of a booster seat. In examples, a signal may be correlated to the detection and/or presence of a booster seat occupied by a human and/or animal. In examples, a signal may be correlated to the detection and/or presence of a box or other inanimate object. Any combination of various signal correlation described may be implemented.

In examples, the sensitivity of the one or more sensor pads 138 and/or their arrangement may be configured to only cause a signal to be generated, output, and/or sent to vehicle 300 when vehicle seat 100 is occupied by predetermined occupants and/or other bodies.

In examples, as described in further detail later, based on the signals generated and/or sent by ODS 132 and/or sensor pads 138 the occupant protection system of vehicle system 300 may determine whether to activate one or more safety systems. For example, based on the signals generated and/or sent by ODS 132 and/or sensor pads 138 vehicle system 300 may determine to activate a seatbelt system, an airbag system, one or more seatback and/or headrest adjustment safety systems as described, for example, in U.S. Pat. Nos. 11,279,270, 11,235,689, co-pending U.S. patent application Ser. No. 17/217,786, filed Mar. 30, 2021, co-pending U.S. patent application Ser. No. 17/589,579, filed on Jan. 31, 2022, and/or co-pending U.S. application Ser. No. 17/122,271, filed on Dec. 15, 2020, all of which are incorporated herein by reference in their entirety for all purposes, or any combination thereof.

Figures 1J, 1K:
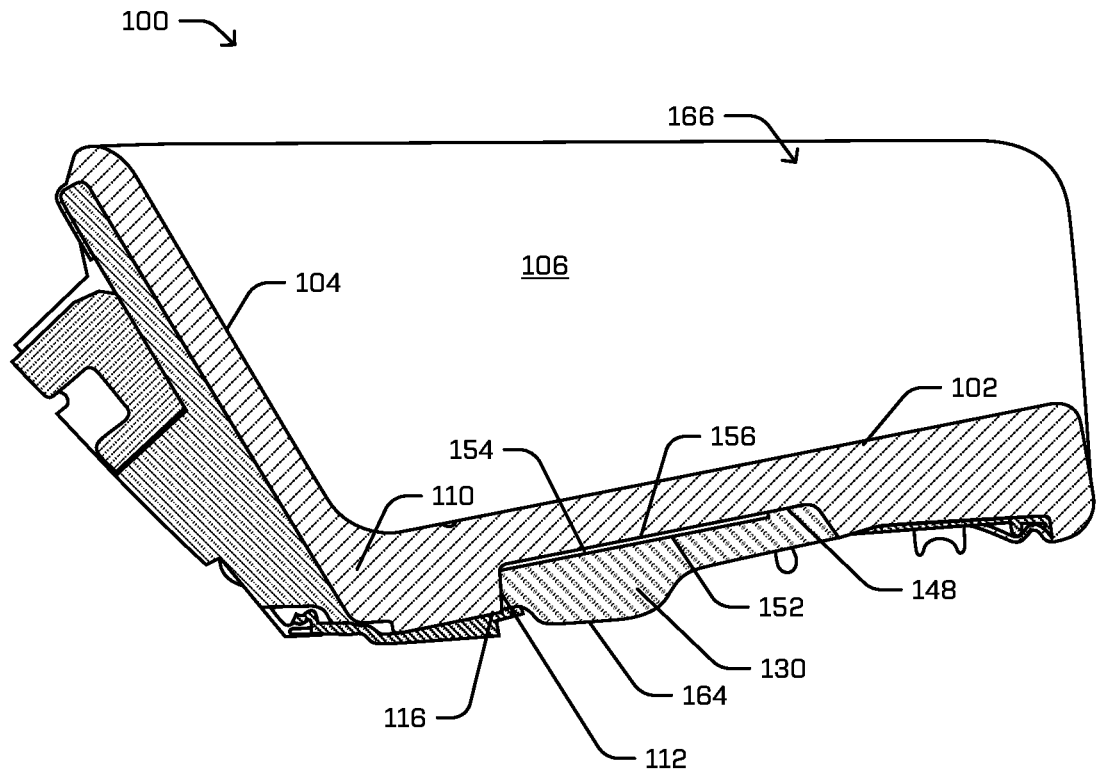

As illustrated in FIGS. 1J and 1K, in examples, edge portion 148 may be configured such that when plug or insert 130 is inserted in recess or well 112, edge portion 148 abuts against a bottom or back surface of vehicle seat 100 preventing contact between depressed or unrelieved area 152 and the bottom or back surface. FIG. 1J is a cross-sectional view at line A-A of vehicle seat 100 with plug or insert 130 installed. FIG. 1K is an enlarged view of FIG. 1J. In examples, this may result in a gap 154 being defined between depressed or unrelieved area 152 of plug or insert 130 and the bottom or back surface of vehicle seat 100.

In examples, as illustrated in FIG. 1K, in addition to and/or instead of providing a relieved edge portion 148 on plug or insert 130, an additional indentation 168, shown in broken line, may be provided in recess or well 112 at a portion of the bottom or back surface of vehicle seat 100 that faces plug or insert 130. In examples, the additional indentation 168 in recess or well 112 at the bottom or back surface of vehicle 100 may be formed by configuring the mold used to form the vehicle seat 100 molded body 166 to cause such additional indentation to be formed. In examples, the additional indentation 168 may be formed by removing foam material from the bottom or back surface of vehicle 100 inside an area of recess or well 112 after the molded body 166 of vehicle seat 100 is formed. In examples, a combination of these steps may be implemented.

In examples, the one or more sensor pads 138 of ODS 132 may be provided over the depressed or unrelieved area 152 of plug or insert 130. In examples, the gap 154 may have a thickness that is equal to or greater than the thickness of the one or more sensor pads 138. In examples, the gap 154 may have a thickness that is greater than the thickness of the one or more sensor pads 138.

In examples, gap 154 may have a thickness ranging from 2.5 mm to 6 mm. In examples, gap 154 may have a thickness of is 2.5 mm, 3 mm, 3.5 mm, 4 mm, 4.5 mm, 5 mm, 5.5 mm, or 6 mm. In examples, the thickness of gap 154 may be within a range defined by any two of the listed examples. In examples, gap 154 may help improve reliability in ODS 132. In examples, gap 154 may compensate for potential pre-compression that may result from manufacturing tolerances, foam filler expansion, component placement, or other manufacturing or design of vehicle seat 100. In examples, by improving repeat sensor reliability for the ODS 132, it may be possible to employ a less advanced ODS but still maintain the desired functionality.

In examples, the recess or well 112 and thus plug or insert 130 may installed in the recess or well 112 to be at a threshold distance from a top and/or front surface of a vehicle seat. In examples, the threshold distance may be defined by a thickness of foam filler 110 may be provided between a top or front surface of vehicle seat 100 and top surface 136 of plug or insert 130 and/or recess or well 112. In examples, a thickness of foam filler 110 provided between a top or front surface of vehicle seat 100 and top surface 136 of plug or insert 130 and/or recess or well 112 is greater than zero millimeters.

In examples, a recess or well 112 may be provided at a bottom portion of a seat base 102 at a threshold distance from a top surface of the seat base such that when the insert is installed in the recess it is provided at a bottom portion of the seat base 102 at a threshold distance from the top surface of the seat base 102. In examples, a recess or well 112 may be provided at a bottom surface 116 of seat base 102 and at least a thickness of thickness of foam filler may be provided in seat base 102 between a top surface 122 of seat base 102 and top surface 136 of plug or insert 130 when plug or insert 130 is installed in recess or well 112. In examples, a recess or well 112 may be provided at a bottom surface 116 of seat base 102 and at least a thickness of foam filler may be provided in seat base 102 between a top surface 122 of seat base 102 and recessed portion 156 of bottom surface 116 of seat base 102 over top surface 136 of plug or insert 130 when plug or insert 130 is installed in recess or well 112.

Similarly, in examples, a recess or well 112 may be provided at a back portion of a seatback 104 at a threshold distance from a front surface of the seatback such that when the insert is installed in the recess it is provided at a back portion of the seatback 104 at a threshold distance from the front surface of the seatback 104. In examples, a recess or well 112 may be provided at a back surface 118 of seatback 104 and at least a thickness of foam filler may be provided between a front surface 128 of backseat 102 and a recess or well 112, and/or top surface 136 of plug or insert 130 when plug or insert 130 is installed in recess or well 112.

In examples the threshold distance and/or thickness of foam material 110 between a recess or well 112 and/or plug or insert 130 and a top and/or front surface of a vehicle seat 100 may be configured to be large enough to avoid read through the top and/or front surface of the vehicle seat 100 but not so large to substantially interfere with the ability of the one or more sensor pads 138 of ODS 132 from sensing a pressure over the top and/or front surface of the vehicle seat 100. In examples, the threshold distance and/or thickness of foam material 110 between a recess or well 112 and/or plug or insert 130 and a top and/or front surface of a vehicle seat 100 may be configured to avoid any appearance of the presence of an insert and/or ODS from a visual inspection of the top and/or front surface of vehicle seat 100.

In examples, the thickness of foam filler 110 and/or the threshold distance between a top or front surface of vehicle seat 100 and a recessed portion of bottom or back surface of vehicle seat 100 and/or front surface 136 of plug or insert 130 may range from 5 mm to 60 mm, for example, 10 mm, 15 mm, 20 mm, 25 mm, 30 mm, 35 mm, 40 mm, 45 mm, 50 mm, 55 mm, or 60 mm. In examples, the thickness may fall within a range defined by any two of the listed examples.

In examples, the thickness of plug or insert 130 may be dependent on the contour of the vehicle floor and/or frame. In examples, it may be desirable for top surface 136 of plug or insert 130 to be a reaction surface so that as a force is pushed against to surface 136 the one or more sensor pads 138 of ODS 132 may sense the pressure. Accordingly, in examples, the thickness of plug or insert 130 may be configured to extend from gap 154 to a portion of vehicle floor and/or frame.

In examples, the thickness of the plug or insert 130 may be configured to compensate for the thickness of foam filler provided between a top or front surface of vehicle seat 100 and plug or insert 130. In examples, the combined thickness of the plug or insert 130 and of the foam filler located between a top or front surface of vehicle seat 100 and plug or insert 130 may be approximately or substantially equal to the thickness of a portion of the vehicle seat 100 where no recess or well 112 is located. For example, if at a portion of seat base 102 where recess or well 112 is not present has a thickness of 100 mm, and the foam filler between top surface 122 of seat base 102 and plug or insert 130 is 30 mm, then plug or insert 130 may have a thickness of about 70 mm. A similar correlation may be present with respect to the seatback 104. In examples, if the portion of the vehicle seat 100 where plug or insert 130 is to be installed has a thickness of about 150 mm or less as previously described, the thickness of plug or insert 130 may range from about 150 mm to 150 mm minus a thickness of filler material provided between plug or insert 130 and a top or front surface of vehicle seat 100 when plug or insert 130 is installed in recess or well 112.

In alternative examples, the thickness of plug or insert 130 may be independent of the thickness of the foam filler between plug or insert 130 and a top or front surface of vehicle seat 100. In examples, the thickness of plug or insert 130 may be independent of the total thickness of a portion of the vehicle seat 100.

In examples, a bottom surface 164 of plug or insert 130 may be flat or contoured. In examples, the bottom surface 164 of plug or insert 130, opposite the top surface 136, may be configured to mate with a structure that is provided under or behind plug or insert 130. In examples, the bottom surface 164 of plug or insert 130 may be configured to mate with a portion of the vehicle floor and/or frame.

Figure 2:
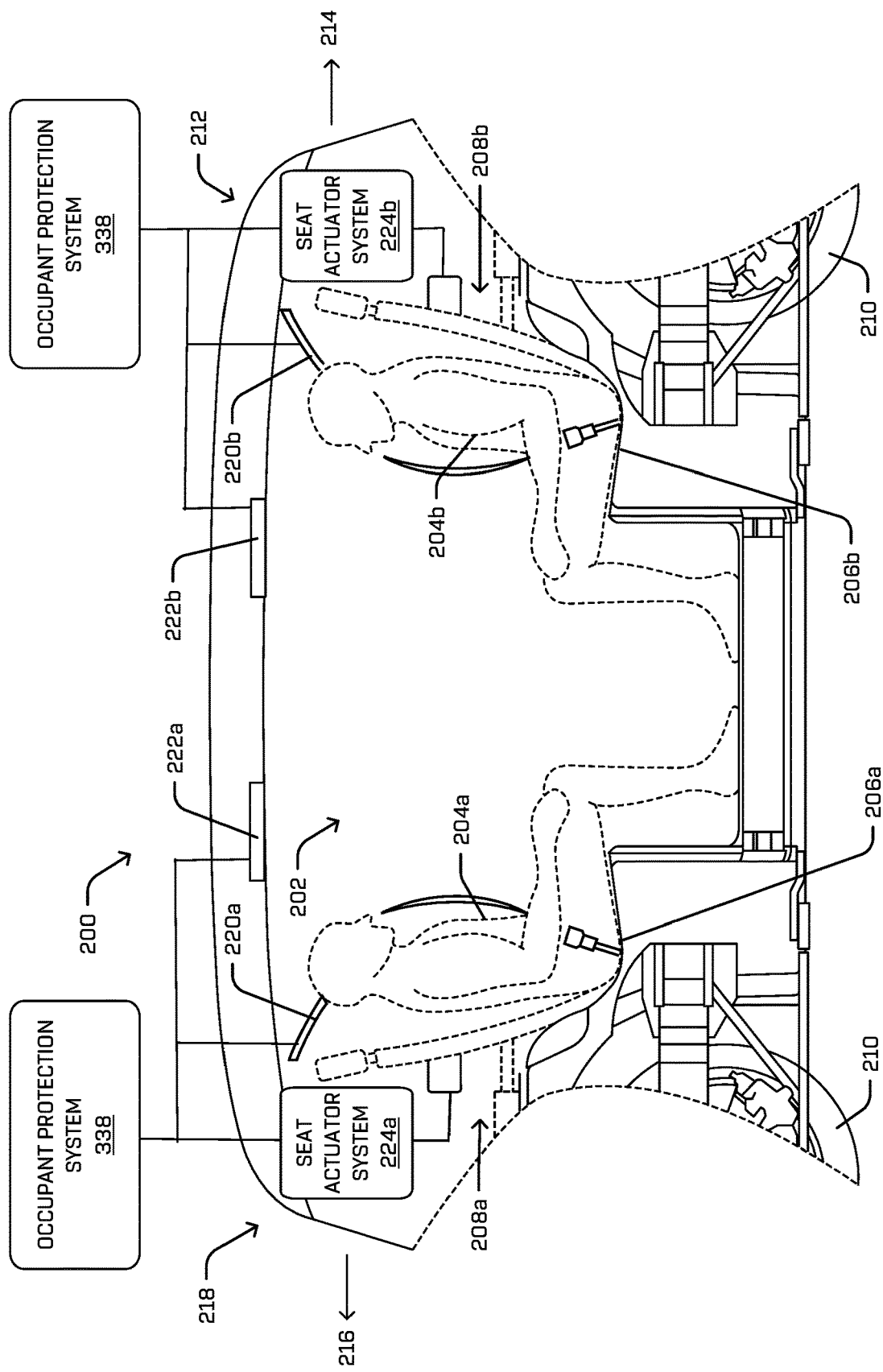
FIG. 2 illustrates an example vehicle in which the vehicle seat with insert and occupant protection system as described may be implemented.

FIG. 2 illustrates an example of a vehicle 200 that may include vehicle seat 100 with one or more inserts 130 as described herein. In examples, vehicle 200 may be an autonomous automobile. FIG. 2 is a side cutaway view showing an interior 202 of an example vehicle 200, including a pair of occupants 204 (e.g., occupants 204A and 204B). The example vehicle 200 may be configured to travel via a road network from one geographic location to a destination carrying one or more of the occupants 204. For example, the interior 202 may include a plurality of seats 206 (e.g., seats 206A and 206B), which may be provided in any relative arrangement. In examples, one or more vehicle seats 206 may be implemented as vehicle seat 100 with one or more inserts 130 as described herein. The example vehicle 200 shown in FIG. 2 includes an example carriage-style vehicle seats 206 providing a seating arrangement in a substantially central portion of the interior 202 of the vehicle 200. For example, the vehicle 200 may include two or more rows 208 (e.g., rows 208A and 208B) of seats 206, and in some examples, two of the rows 208 of seats 206 may face each other, for example, as shown in FIG. 2. One or more of the rows 208 of seats 206 may include two seats 206. In some examples, one or more of the two seats 206 may be a bench-style seat configured to provide seating for one or more occupants 204. Other relative arrangements and numbers of seats 206 are contemplated. In examples, where two or more seats 206 are present in vehicle 200, one or more of seats 206 may be implemented as vehicle seats 100 with one or more inserts 130 as described herein. In examples, every seat 206 of vehicle 200 may include a vehicle seat 100 with one or more inserts 130 as described. In examples, fewer than all seats 206 may include a vehicle seat 100 with one or more inserts 130. In examples, only one seat 206 in vehicle 200 may include a vehicle seat 100 with one or more inserts 130. In examples, one or more seats 206 of vehicle 200 may include a vehicle seat 100 as described herein with or without one or more inserts 130.

For the purpose of illustration, the vehicle 200 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 200 may be configured to control all functions from start to completion of the trip, including all parking functions, it may not include a driver and/or controls for driving the vehicle 200, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

The example vehicle 200 may be any configuration of vehicle, such as, for example, a van, a sport utility vehicle, a cross-over vehicle, a truck, a bus, an agricultural vehicle, and a construction vehicle. The vehicle 200 may be powered by one or more internal combustion engines, one or more electric motors, hydrogen power, any combination thereof, and/or any other suitable power sources. Although the example vehicle 200 has four wheels 210, the systems and methods described herein may be incorporated into vehicles having fewer or a greater number of wheels, tires, and/or tracks. The example vehicle 200 may have four-wheel steering and may operate generally with equal performance characteristics in all directions, for example, such that a first end 212 of the vehicle 200 is the leading end of the vehicle 200 when travelling in a first direction 214, and such that the first end 212 becomes the trailing end of the vehicle 200 when traveling in the opposite, second direction 216, as shown in FIG. 2. Similarly, a second end 218 of the vehicle 200 is the leading end of the vehicle 200 when travelling in the second direction 216, and such that the second end 218 becomes the trailing end of the vehicle 200 when traveling in the opposite, first direction 214. These example characteristics may facilitate greater maneuverability, for example, in small spaces or crowded environments, such as parking lots and urban areas.

As shown in FIG. 2, the vehicle 200 may include an occupant protection system 338 configured to protect one or more of the occupants 204 during operation of vehicle 200. For example, an occupant protection system may be configured to protect one or more occupants 204 in the event of a predicted collision and/or an actual collision involving vehicle 200. For example, the occupant protection system 338 may include a seatbelt system 220, an airbag system 222, one or more seat actuators 224 as for example disclosed in in U.S. Pat. Nos. 11,279,270, 11,235,689, co-pending U.S. patent application Ser. No. 17/217,786, filed Mar. 30, 2021, co-pending U.S. patent application Ser. No. 17/589,579, filed on Jan. 31, 2022, and/or co-pending U.S. application Ser. No. 17/122,271, filed on Dec. 15, 2020, all of which are incorporated herein by reference in their entirety, or a combination of both. In examples, seatbelt system 220 may be configured to restrain an occupant 204 to avoid ejection from seat 206. In examples, airbag system 222 may be configured to cushion an occupant 204 and reduce forces on an occupant's chest and abdomen by controlling movement of the occupant's body. In examples, one or more seat actuators 224 may be configured to promote engagement of an occupant to a seatback, head rest, or both of seat 206 by causing expansion and/or translation of one or more components of seat 206 relative to occupant 204 as described, for example, in U.S. Pat. Nos. 11,279,270, 11,235,689, co-pending U.S. patent application Ser. No. 17/217,786, filed Mar. 30, 2021, co-pending U.S. patent application Ser. No. 17/589,579, filed on Jan. 31, 2022, and/or co-pending U.S. application Ser. No. 17/122,271, filed on Dec. 15, 2020.

Figure 3:
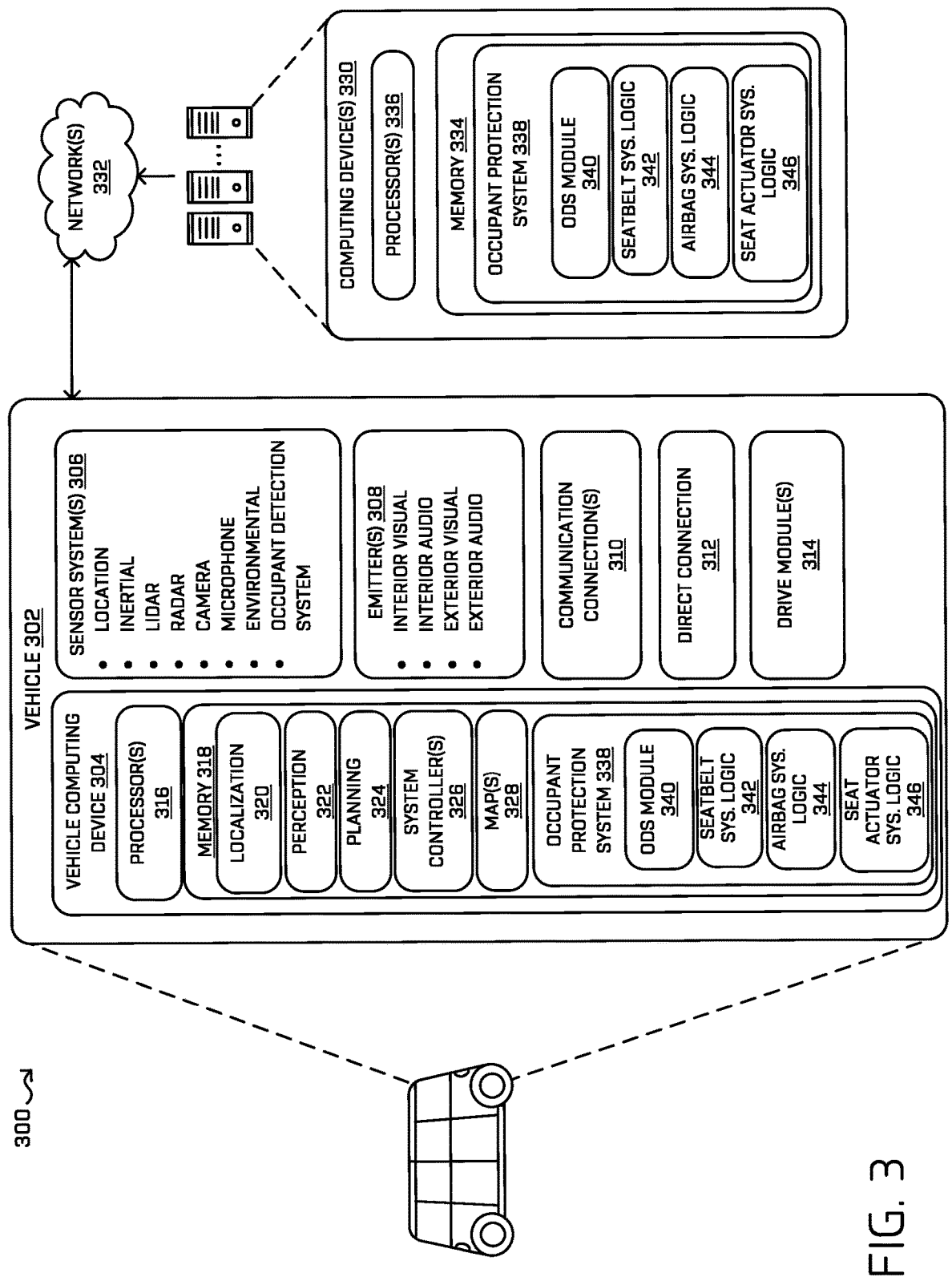
FIG. 3 is a block diagram example system for implementing the techniques described herein.

FIG. 3 depicts a block diagram of an example system 300 for implementing the techniques described herein. In at least some examples, the system 300 may include a vehicle 200, which may include one or more vehicle seats 100 with plug or insert 130 as shown in FIGS. JA-1K. The system 300 of vehicle 200 may include a vehicle computing device 304, one or more sensor systems 306, one or more emitters 308, one or more communication connections 310, at least one direct connection 312, and one or more drive modules 314. The vehicle computing device 304 may include one or more processors 316 and memory 318 communicatively coupled with the one or more processors 316. In the illustrated example, the vehicle 302 is an autonomous vehicle. However, the vehicle 302 may be any other type of vehicle. In the illustrated example, the memory 318 of the vehicle computing device 304 stores a localization component 320, a perception component 322, a planning component 324, one or more system controllers 326, one or more map(s) 328, and an example occupant protection system 338. Though depicted in FIG. 3 as residing in memory 318 for illustrative purposes, it is contemplated that the localization component 320, the perception component 322, the planning component 324, the one or more system controllers 326, the one or more maps 328, and the occupant protection system 338 may additionally, or alternatively, be accessible to the vehicle 200 (e.g., stored on, or otherwise accessible by, memory remote from the vehicle 200 and/or system 300).

In examples, the localization component 320 may be configured to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment and may continuously determine a location and/or orientation of the autonomous vehicle within the map. In some examples, the localization component 320 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 320 may provide data to various components of the vehicle 302 to determine an initial position of an autonomous vehicle for generating a candidate trajectory, as discussed herein.

In some examples, the perception component 322 may be configured to perform object detection, segmentation, and/or classification. In some examples, the perception component 322 may provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 322 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 324 may determine a path for the vehicle 302 to follow to traverse through an environment. For example, the planning component 324 may determine various routes and trajectories and various levels of detail. For example, the planning component 324 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 324 may generate an instruction for guiding the autonomous vehicle along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In at least one example, the planning component 324 may determine a location of a user based on image data of an environment received from the user using, for example, bags of binary words with image-based features, artificial neural network, and the like. Further, the planning component 324 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 302 may stop to pick up a passenger. In at least one example, the planning component 324 may determine a pickup location based at least in part on determining a user identity (e.g., determined via image recognition or received as an indication from a user device, as discussed herein).

In at least one example, the vehicle computing device 304 may include one or more system controllers 326, which may be configured to control steering, propulsion, braking, safety, emitters, communication, and other systems of the vehicle 302. These system controller(s) 326 may communicate with and/or control corresponding systems of the drive module(s) 314 and/or other components of the vehicle 302.

The memory 318 may further include one or more map(s) 328 that may be used by the vehicle 302 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 328 may include at least one map (e.g., images and/or a mesh). In some examples, the vehicle 302 may be controlled based at least in part on the maps 328. That is, the maps 328 may be used in connection with the localization component 320, the perception component 322, and/or the planning component 324 to determine a location of the vehicle 302, identify objects in an environment, and/or generate routes and/or trajectories to navigate within an environment.

In some examples, the one or more map(s) 328 may be stored on a remote computing device(s) (such as computing device(s) 330) accessible via one or more network(s) 332. In some examples, multiple maps 328 may be stored based on, for example, a characteristic (e.g., type of entity, time of day, day of week, season of the year, etc.). Storing multiple maps 328 may have similar memory requirements but increase the speed at which data in a map may be accessed.

As shown in FIG. 3, in some examples, the occupant protection system 338 may be stored in the memory 318 of the computing device 304 of the vehicle 302 or remote from the vehicle 302 in the memory 334 of the computing device(s) 330. In some examples, some portions of the occupant protection system 338 may be stored in the memory 318 of the computing device 304 of the vehicle 302, and other portions of the occupant protection system 338 may be stored remotely in the memory 334 of the computing device(s) 330, and the separately located portions of the occupant protection system 338 may operate together in a coordinated manner.

In some examples, aspects of some or all of the components discussed herein may include any models, algorithms, and/or machine learning algorithms. For example, in some examples, the components in the memory 318 and/or the memory 334 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 306 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 306 may include multiple examples of each of these or other types of sensors. For example, the LIDAR sensors may include individual LIDAR sensors located at the corners, front, back, sides, and/or top of the vehicle 302. As another example, the camera sensors may include multiple cameras disposed at various locations about the exterior and/or interior of the vehicle 302. In examples, sensor system(s) 306 may include one or more ODS 132 embedded in a vehicle seat with an insert as described herein. The sensor system(s) 306 may provide input to the vehicle computing device 304. Additionally, or alternatively, the sensor system(s) 306 may send sensor data, via the one or more networks 332, to the one or more computing device(s) 330 at a particular frequency, after a lapse of a predetermined period of time, in near real-time, etc.

The vehicle 302 may also include one or more emitters 308 for emitting light and/or sound, as described above. The emitters 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 302 may also include one or more communication connection(s) 310 that enable communication between the vehicle 302 and one or more other local or remote computing device(s). For example, the communication connection(s) 310 may facilitate communication with other local computing device(s) on the vehicle 302 and/or the drive module(s) 314. Also, the communication connection(s) 310 may allow the vehicle 302 to communicate with other nearby computing device(s) (e.g., other nearby vehicles, traffic signals, etc.). The communications connection(s) 310 also enable the vehicle 302 to communicate with a remote teleoperations computing device or other remote services.

The here communications connection(s) 310 may include physical and/or logical interfaces for connecting the vehicle computing device 304 to another computing device or a network, such as network(s) 332. For example, the communications connection(s) 310 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 may include one or more drive modules 314. In some examples, the vehicle 302 may have a single drive module 314. In at least one example, if the vehicle 302 has multiple drive modules 314, individual drive modules 314 may be positioned on opposite ends of the vehicle 302 (e.g., the leading end and the rear, etc.). In at least one example, the drive module(s) 314 may include one or more sensor systems to detect conditions of the drive module(s) 314 and/or the surroundings of the vehicle 302. By way of example and not limitation, the sensor system(s) 306 may include one or more wheel encoders (e.g., rotary encoders) to sense rotation of the wheels (e.g., wheels 110 in FIG. 1) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 314. In some cases, the sensor system(s) on the drive module(s) 314 may overlap or supplement corresponding systems of the vehicle 302 (e.g., sensor system(s) 306).

The stopped here drive module(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 may include a drive module controller, which may receive and preprocess data from the sensor system(s) 306 and to control operation of the various vehicle systems. In some examples, the drive module controller may include one or more processors and memory communicatively coupled with the one or more processors. The memory may store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 may provide a physical interface to couple the one or more drive module(s) 314 with the body of the vehicle 302. For example, the direct connection 312 may allow the transfer of energy, fluids, air, data, etc. between the drive module(s) 314 and the vehicle 302. In some examples, the direct connection 312 may further releasably secure the drive module(s) 314 to the body of the vehicle 302.

In at least one example, the localization component 320, perception component 322, the planning component 324, and/or the occupant protection system 120 may process sensor data, as described above, and may send their respective outputs, over the one or more network(s) 332, to one or more computing device(s) 330. In at least one example, the localization component 320, the perception component 322, the planning component 324, and/or the occupant protection system 120 may send their respective outputs to the one or more computing device(s) 330 at a particular frequency, after a lapse of a predetermined period of time, in near real-time, etc.

The processor(s) 316 of the vehicle 302 and/or the processor(s) 336 of the computing device(s) 330 may include any suitable processor capable of executing instructions to process data and perform operations as described herein. By way of example and not limitation, the processor(s) 316 and 336 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 334 are examples of non-transitory computer-readable media. The memory 318 and 334 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

As shown in FIG. 3, the seatbelt system 220, the airbag system 222, and/or the seat actuator system 212 may be associated with one or more of the vehicle computing devices 304 on board the vehicle 302 or the remote computing device(s) 330. In some examples, for example as shown in FIG. 3, the occupant protection system 338 may include means for communicating with the one or more ODS 132 in one or more vehicle seats, and with the logic controls for one or more safety systems. In examples, the occupant protection system 338 may include an ODS module 340 to communicate with one or more ODS 132. Alternatively, and/or in addition to ODS module 340, occupant protection system 338 may be configured to communicate with one or more ODS 132 in the same manner as one or more other vehicle computing device(s) 304 communicate with one or more of sensor system(s) 306. In examples, the occupant protection system 338 may include the seatbelt system logic control components 342 to control and operate seatbelt system 220. In examples, the occupant protection system 338 may include the airbag system logic control components 344 to control and operate airbag system 222. In examples, the occupant protection system 338 may include the seatbelt system logic control components 346 to control and operate seat actuator system 224. In examples, occupant protection system 338 may be configured to control one or more of seatbelt system 220, airbag system 222, and/or seat actuator system 224 based, at least in part, on one or more received signals caused to be generated, output, and/or sent by one or more ODS 132 embedded in a vehicle seat with insert as described herein.

It should be noted that while FIG. 3 is illustrated as a distributed system, in alternative examples, components of the vehicle 302 may be associated with the computing device(s) 330, and/or components of the computing device(s) 330 may be associated with the vehicle 302. That is, the vehicle 302 may perform one or more of the functions associated with the computing device(s) 330 and vice versa.

Figure 4:
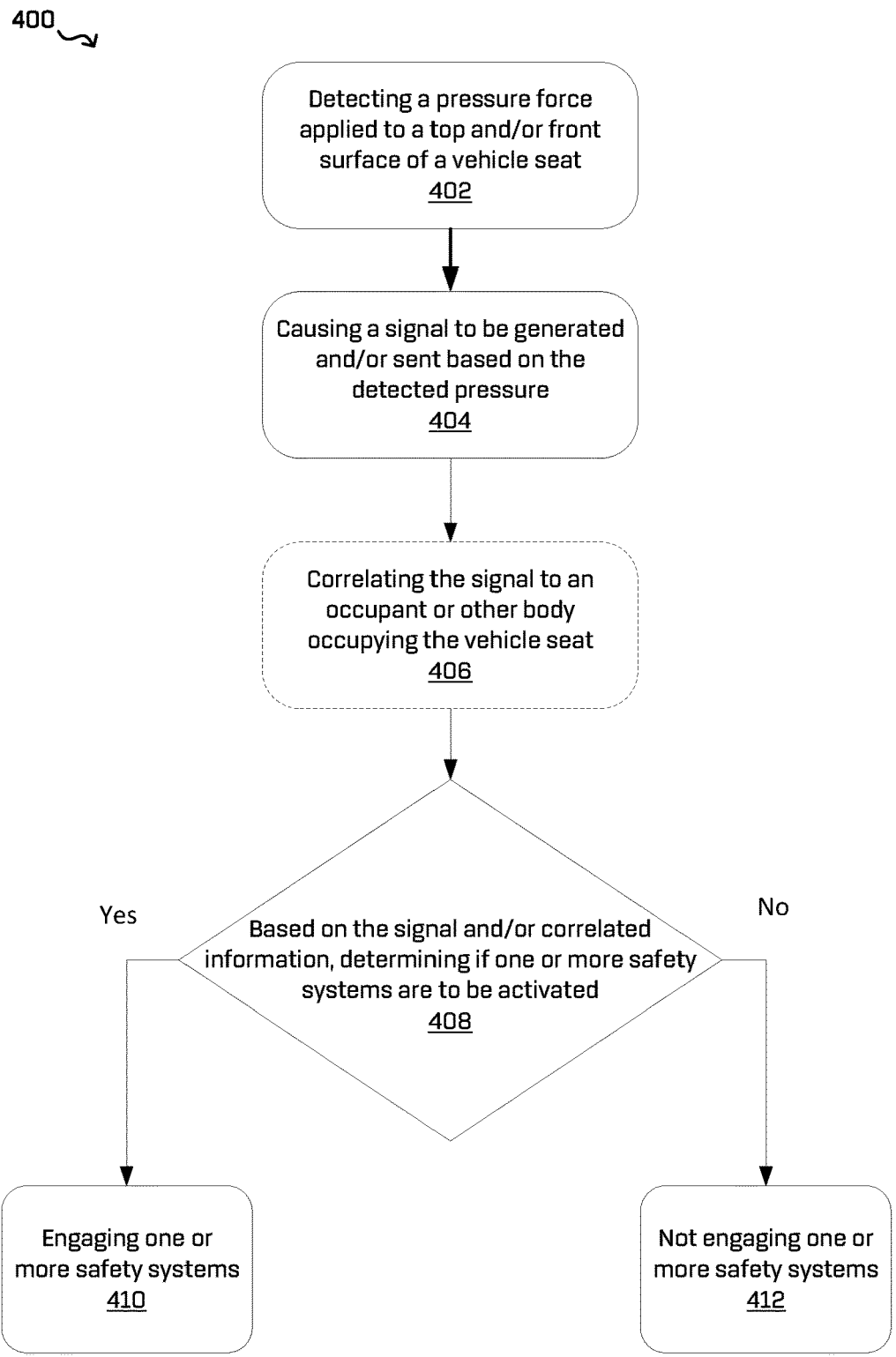
FIG. 4 is an example process for the operation of the occupant protection system as described herein.

FIG. 4 illustrates an example flow chart of an example process 400 using the system as described herein. In examples, a vehicle may be provided including a vehicle seat with insert and ODS as described herein. At 402 an occupant or other body may occupy the vehicle seat. In examples, as the occupant or other body takes residence on vehicle seat a force is applied to the top and/or front surface of the vehicle seat due to the weight of the occupant or other body. In examples, the force is applied to a top surface of a seat base, the front surface of a seatback, or a combination of both. In examples, the vehicle seat may include one or more inserts with ODS as described in the seat base, in the seatback, or in both. In examples, as a force is applied to the vehicle the top and/or front surface of the vehicle seat a pressure force may be detected by one or more sensor pads of one or more ODS. In examples, control of one or more safety systems may be based on one or more signals caused to be generated, output, and/or sent by the one or more ODS.

In examples, if an occupant or other body occupying the vehicle seat does not cause a sufficient pressure force for detection by one or more ODS, then no signals may be caused to be generated, output, and/or sent by one or more ODS, and occupant protection system 338 may not alter the activation of any of the safety systems. In examples, a pressure force may not be sufficient to be sensed by one or more ODS because of the weight, size, and/or shape of the occupant and/or other body occupying the vehicle seat or because no occupant or other body is occupying the vehicle seat. In examples, the sensitivity level of one or more sensor pads of one or more ODS may be set to only sense a pressure force above a threshold. In examples, one or more sensor pads of one or more ODS may be arranged to only detect a pressure force applied at certain regions of the top and/or front surface of the vehicle seat. In examples, a combination of sensitivity level and arrangement configuration may be employed to configure the system to detect a pressure force only for certain occupants and/or other body when occupying the vehicle seat. For example, the system may be configured to cause one or more signals to be generated, output, and/or sent only when an occupant above a threshold size and/or weight occupies the vehicle seat. In examples, the system may be configured to avoid causing a signal to be generated, output, and/or sent when an occupant below a threshold size and/or weight occupies the vehicle seat and/or when another body occupies the vehicle seat. For example, the system may be configured to avoid causing a signal to be generated, output, and/or sent when the size and/or weight occupying the vehicle seat is that of a child, of a booster seat with or without a child, of an animal, and/or of an inanimate object such as a box.

In examples, the pressure force is detected at 402, and in response at 404 one or more ODS may cause one or more signals to be generated, output, and/or sent to vehicle system 300 and/or occupant protection system 338. In examples, a signal may be communicated from ODS to vehicle system 300 via a coupler connection 144 as previously described, wirelessly, or any combination thereof. In examples, at 408, occupant protection system 338 may cause engagement of one or more safety system based on the mere receipt of one or more signals caused to be generated, output, and/or sent by the one or more ODS.

In examples, one or more signals caused to be generated, output, and/or sent by the one or more ODS may be indicative of a given pressure forced being sensed. In examples, the one or more ODS may include sensor pads arranged in patterns configured to detect pressure when certain size, shape, and/or weight of an occupant or other body occupies the vehicle seat. In examples, the one or more ODS may include sensor pads configured to sense varying amounts of pressure and cause to generate and/or send one or more signals relative to the pressure sensed. In examples, a combination of pattern configurations and pressure sensitivity may be utilized to more accurately determine what may be occupying the vehicle seat. In examples, having two or more ODS via two or more inserts in one two or more portions of the vehicle seat, for example in the seat base and/or in the seatback, may further be relied upon to further configure signaling based on what is occupying the vehicle seat.

In examples, at 406, occupant protection system 338 may optionally correlate one or more signals received to a type of occupant and/or body. For example, one or more signals may be indicative of a pressure force that may be correlated to the presence of an occupant such as an adult human. In examples, one or more signals may be indicative of a pressure force that may be correlated to the presence of an animal, an object, a child, or any combination thereof. In examples, one or more signals may be indicated of a pressure force that may be correlated to the presence of a booster seat with or without a child in it. In examples, the correlation may be performed based on preestablished measurements, via artificial intelligence, or any combination thereof. In examples, a look-up table may be used.

In examples, at 408, based on the correlated information, the occupant protection system 338 may determine whether to engage or disengage one or more safety systems. For example, if an adult human is detected to be the occupant, the seatbelt safety system, the airbag safety system, and any other safety systems may all be activated to best protect the occupant in the event of a collision or similar event. In examples, if what is detected is not an adult human, for example a child in a booster seat, one or more safety systems, for example the airbag safety system may be disengaged and/or not activated. Selective activation and/or engagement or disengagement or one or more safety systems may materially improve safety for the occupant and/or other body on the vehicle seat. In examples, at 408, engagement of one or more safety systems may be based simply on the receipt of one or more signals without the optional correlation at 406.

As described earlier, safety system may include one or more of a seatbelt safety system, an airbag safety system, a seat actuator safety system, or any combination thereof. In examples, the engagement and/or disengagement of two or more safety system may be controlled simultaneously based on one or more signals the one or more ODS cause to be generated, output, and/or sent.

Figure 5:
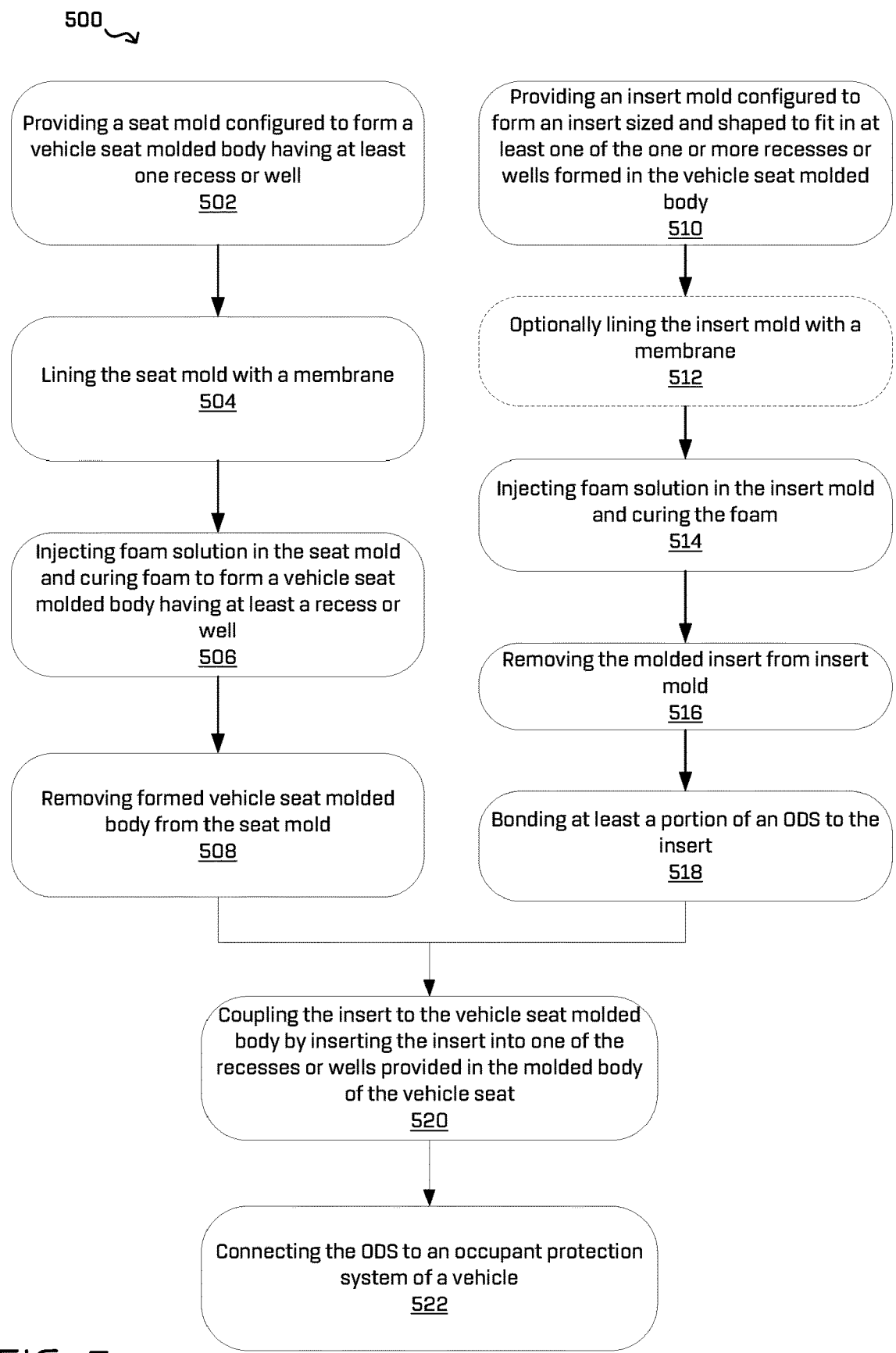
FIG. 5 illustrates an example flow chart of an example manufacturing process to assemble the system as described herein.

FIG. 5 illustrates an example flow chart of an example manufacturing process 500 to assemble the system as described herein. At 502 the process may include providing a seat mold configured to form a molded body of a vehicle seat 100 having one or more recesses or wells 112 as previously described. At 504, the seat mold may be lined with a membrane 108. At 506, a foam solution may be injected into the seat mold lined with membrane 108. The foam solution may then be cured and form foam filler 110. Once the foam filler 110 is set, the vehicle seat molded body may be removed from the seat mold. As previously described, in examples, the vehicle seat molded body may include a seat base 102, a seatback 104, and one or more sides 106. In examples, the vehicle seat molded body may include one or more recesses or wells 112.

At 510 an insert mold configured to form a plug or insert 130 sized and shaped to fit in at least one of the one or more recesses or wells 112 formed in the vehicle seat molded body may be provided. Optionally, at 512 the insert mold may be lined with a membrane that may be the same or different from membrane 108. In examples, a foam solution may be injected in the insert mold and cured. In examples, the foam solution injected into the insert mold may be the same, similar, or different material as that used to form foam filler 110. In examples, the foam solution injected in the insert mold may be the same as the foam solution injected in the seat mold and the cured foam filler 110 may be the same as the cured foam of the plug or insert 130. In examples, after the foam injected in the insert mold is cured, the formed plug or insert 130 may be removed from the insert mold. At 518, one or more sensor pads 138 and/or other portions of an ODS 132 may be bonded to plug or insert 130. In examples, a pressure sensitive adhesive may be used to bond the one or more sensor pads 138 and/or other portions of an ODS 132 to plug or insert 130.

Although illustrated such that processes 510 to 518 are performed in parallel with 502 to 508, it should be recognized that processes 502 to 508 may be performed before, after, or at the same time as processes 510 to 518.

Once the vehicle seat molded body is complete after 508 and a plug or insert 130 with at least a portion of an ODS is bonded thereto after 518, the plug or insert 130 may be coupled to the vehicle seat molded body at 520. In examples, the coupling may include at least partially inserting plug or insert 130 into a recess or well 112 in the molded body of vehicle seat 100. In examples, an adhesive such as a pressure sensitive adhesive, may be provided between one or more contacting surfaces of the plug or insert 130 and the molded body of vehicle seat 100. In examples, at 522 the ODS 132 may be connected to the vehicle system 300 and/or to the occupant protection system 338 of vehicle system 300. In examples, 522 may be performed prior to 520. In examples, 520 and 522 may be performed at the same time.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 300 shown in FIG. 3 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 300. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 300 may be transmitted to the architecture 300 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 200 is discussed below.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for vehicle seats with integrated sensors and/or safety systems have been presented herein. Moreover, although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

Example Clauses:

A. A method of embedding an occupant detection system in a vehicle seat, comprising: forming a vehicle seat molded body comprising a recess including injecting a first foam into a seat membrane within a first mold; forming a plug; providing at least a portion of the occupant detection system on the plug; and coupling the plug with at least a portion of the occupant detection system provided thereon to the vehicle seat molded body by placing the plug into the recess, wherein a gap is defined by a surface of the recess in the vehicle seat molded body and a surface of the insert.

B. The method of paragraph A, wherein the at least a portion of the occupant detection system is provided on the surface of the plug that defines the gap with the surface of the recess.

C. The method of paragraph A or B, further comprising forming the plug by injection molding.

D. The method of any one of paragraphs A-C, wherein providing at least a portion of the occupant detection system on the plug comprises bonding one or more sensor pads of the occupant detection system to the plug.

E. The method of any one of paragraphs A-D, further comprising bonding the plug to the vehicle seat molded body.

F. The method of any one of paragraphs A-E, wherein the vehicle seat molded body comprises a seat base and the recess is provided at a bottom portion of the seat base at a threshold distance from a top surface of the seat base such that when the plug is installed in the recess it is provided at the bottom portion of the seat base at a threshold distance from the top surface of the seat base.

G. A method of embedding an occupant detection system in a vehicle seat, comprising: forming a vehicle seat molded body comprising a recess by injecting a first foam into a first mold; forming a plug by injecting a second foam into a second mold; providing the occupant detection system on the insert; and installing the plug with the occupant detection system provided thereon into the recess of the vehicle seat molded body.

H. The method of paragraph G, wherein providing the occupant detection system on the plug comprises bonding one or more sensor pads of the occupant detection system onto a top surface of the plug.

I. The method of paragraph G or H, further comprising bonding the plug to the vehicle seat molded body
J. The method of any one of paragraphs G-I, further comprising forming a gap between a surface of the plug and a surface of the vehicle seat molded body when the plug is installed in the recess of the vehicle seat molded body.
K. The method of any one of paragraphs G-J, wherein the vehicle seat molded body comprises a seat base and the recess is provided at a bottom portion of the seat base at a threshold distance from a top surface of the seat base such that when the plug is installed in the recess it is provided at the bottom portion of the seat base at a threshold distance from the top surface of the seat base.
L. The method of any one of paragraphs G-K, further comprising connecting the occupant detection system to an occupant protection system.
M. The method of any one of paragraphs G-L, further comprising curing the first foam after injection and prior to installing the plug in the recess.
N. The method of any one of paragraphs G-M, further comprising curing the second foam before providing the occupant detection system on the plug.
O. A vehicle seat comprising: a molded body comprising a recess, wherein the molded body comprises an outer membrane and a foam cured in place such that it is coupled to the outer membrane; and a plug comprising one or more sensor pads, the plug provided in the recess of the molded body.
P. The vehicle seat of paragraph O, wherein the molded body comprises a seat base having a top surface and a bottom surface opposite the top surface, and the recess is located at the bottom surface.
Q. The vehicle seat of paragraph P, further comprising foam in the seat base between the top surface and the bottom surface, such that the top surface of the plug is at a threshold distance from the top surface of the seat base defined by a thickness of the foam located between the top surface and the bottom surface of the seat base.
R. The vehicle seat of any one of paragraphs O-Q, wherein the one or more sensor pads are located on a top surface of the plug and they are part of an occupant detection system.
S. The vehicle seat of any one of paragraphs O-R, further comprising a gap defined between a bottom surface of the molded body and a top surface of the plug.
T. The vehicle seat of paragraph S, wherein a thickness of the foam greater than zero is located between the gap and a top surface of the molded body.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

What is claimed is:

1. A method of embedding an occupant detection system in a vehicle seat, comprising:
    forming a vehicle seat molded body comprising a recess including injecting a first foam into a seat membrane within a first mold;
    forming a plug;
    providing at least a portion of the occupant detection system on the plug; and
    coupling the plug with at least a portion of the occupant detection system provided thereon to the vehicle seat molded body by placing the plug into the recess,
    wherein, with the plug coupled to the recess, a gap is defined by a surface of the recess in the vehicle seat molded body and a surface of the plug, and at least a portion of the occupant detection system is disposed in the gap.

2. The method of claim 1, wherein a thickness associated with the gap is proportionate to a thickness associated with the occupant detection system.

3. The method of claim 1, further comprising forming the plug by injection molding.

4. The method of claim 1, wherein providing at least a portion of the occupant detection system on the plug comprises bonding one or more sensor pads of the occupant detection system to the plug.

5. The method of claim 1, further comprising bonding the plug to the vehicle seat molded body.

6. The method of claim 1, wherein the vehicle seat molded body comprises a seat base and the recess is provided at a bottom portion of the seat base at a threshold distance from a top surface of the seat base such that when the plug is installed in the recess it is provided at the bottom portion of the seat base at a threshold distance from the top surface of the seat base.

7. A method of embedding an occupant detection system in a vehicle seat, comprising:
    forming a vehicle seat molded body comprising a recess by injecting a first foam into a first mold;
    forming a plug by injecting a second foam into a second mold;
    providing the occupant detection system on the plug; and
    installing the plug with the occupant detection system provided thereon into the recess of the vehicle seat molded body,
    wherein, with the plug coupled to the recess, a gap is defined by a surface of the recess in the vehicle seat molded body and a surface of the plug, and at least a portion of the occupant detection system is disposed in the gap.

8. The method of claim 7, wherein providing the occupant detection system on the plug comprises bonding one or more sensor pads of the occupant detection system onto a top surface of the plug.

9. The method of claim 7, further comprising bonding the plug to the vehicle seat molded body.

10. The method of claim 7, wherein a thickness associated with the gap is proportionate to a thickness associated with the occupant detection system.

11. The method of claim 7, wherein the vehicle seat molded body comprises a seat base and the recess is provided at a bottom portion of the seat base at a threshold distance from a top surface of the seat base such that when the plug is installed in the recess it is provided at the bottom portion of the seat base at a threshold distance from the top surface of the seat base.

12. The method of claim 7, further comprising connecting the occupant detection system to an occupant protection system.

13. The method of claim 7, further comprising curing the first foam after injection and prior to installing the plug in the recess.

14. The method of claim 7, further comprising curing the second foam before providing the occupant detection system on the plug.

* * * * *